(12) United States Patent
Zhu

(10) Patent No.: US 12,399,996 B2
(45) Date of Patent: Aug. 26, 2025

(54) SOFTWARE UPGRADE METHOD AND APPARATUS

(71) Applicant: Huawei Cloud Computing Technologies Co., Ltd., Guizhou (CN)

(72) Inventor: Jintao Zhu, Xi'an (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 253 days.

(21) Appl. No.: 17/854,492

(22) Filed: Jun. 30, 2022

(65) Prior Publication Data

US 2022/0335130 A1  Oct. 20, 2022

Related U.S. Application Data

(63) Continuation of application No. PCT/CN2020/140759, filed on Dec. 29, 2020.

(30) Foreign Application Priority Data

Dec. 30, 2019 (CN) .......................... 201911400347.4

(51) Int. Cl.
*G06F 21/57* (2013.01)
*G06F 8/65* (2018.01)
*G06F 21/64* (2013.01)

(52) U.S. Cl.
CPC .............. *G06F 21/572* (2013.01); *G06F 8/65* (2013.01); *G06F 21/64* (2013.01); *G06F 2221/033* (2013.01)

(58) Field of Classification Search
CPC .......... G06F 21/572; G06F 8/65; G06F 21/64; G06F 2221/033
See application file for complete search history.

(56) References Cited

U.S. PATENT DOCUMENTS

| 2012/0167071 | A1 | 6/2012 | Paek |
| 2014/0242952 | A1 | 8/2014 | Zhang et al. |
| 2015/0178067 | A1* | 6/2015 | Ji ........................... G01C 21/36 717/170 |
| 2015/0230044 | A1* | 8/2015 | Paun ...................... H04L 67/12 455/41.2 |

(Continued)

FOREIGN PATENT DOCUMENTS

| CN | 101958933 A | 1/2011 |
| CN | 104378391 A | 2/2015 |

(Continued)

*Primary Examiner* — Jung W Kim
*Assistant Examiner* — Alan L Kong
(74) *Attorney, Agent, or Firm* — Conley Rose, P.C.

(57) ABSTRACT

A software upgrade method includes a first terminal device that receives over-the-air (OTA) software upgrade information from a second terminal device; the first terminal device determines that a software upgrade package and OTA upgrade indication information that are included in the OTA software upgrade information are generated by a first network device and provided to the second terminal device; and the first terminal device performs software upgrade based on the software upgrade package after determining, based on the OTA upgrade indication information, that the second terminal device has permission to perform OTA upgrade on the first terminal device.

20 Claims, 7 Drawing Sheets

Second network device

First network device

Second terminal device

First terminal device

(56) References Cited

U.S. PATENT DOCUMENTS

| | | | |
|---|---|---|---|
| 2015/0309782 A1* | 10/2015 | Chen | H04L 67/12 |
| | | | 717/170 |
| 2015/0347121 A1* | 12/2015 | Harumoto | G06F 8/65 |
| | | | 717/172 |
| 2016/0196128 A1 | 7/2016 | Wang et al. | |
| 2017/0118023 A1 | 4/2017 | Gussen et al. | |
| 2017/0324564 A1* | 11/2017 | Knopf | H04L 9/14 |
| 2018/0217828 A1 | 8/2018 | Madrid et al. | |
| 2019/0163465 A1* | 5/2019 | Fassino | G06F 21/64 |
| 2019/0187971 A1* | 6/2019 | Wang | H04W 12/06 |
| 2020/0233654 A1 | 7/2020 | Matsumoto et al. | |

FOREIGN PATENT DOCUMENTS

| | | |
|---|---|---|
| CN | 104820611 A | 8/2015 |
| CN | 105760203 A | 7/2016 |
| CN | 106612192 A | 5/2017 |
| CN | 107621941 A | 1/2018 |
| CN | 107682440 A | 2/2018 |
| CN | 109814906 A | 5/2019 |
| CN | 110351316 A | 10/2019 |
| JP | 2017011491 A | 1/2017 |
| JP | 2018050329 A | 3/2018 |
| WO | 2019012821 A1 | 1/2019 |

\* cited by examiner

SOFTWARE UPGRADE METHOD AND APPARATUS

CROSS-REFERENCE TO RELATED APPLICATIONS

This is a continuation of International Patent Application No. PCT/CN2020/140759 filed on Dec. 29, 2020, which claims priority to Chinese Patent Application No. 201911400347.4 filed on Dec. 30, 2019. The disclosures of the aforementioned applications are hereby incorporated by reference in their entireties.

TECHNICAL FIELD

This disclosure relates to the field of wireless communication, and in particular, to a software upgrade method and an apparatus.

BACKGROUND

With continuous development of the automobile industry and constant progress of connected, autonomous, shared, and electric (CASE) mobility of vehicles, software and hardware functions of the vehicles are becoming increasingly complex. Compared with hardware, software is updated faster and is easier to provide differentiated functions. According to industry analysis, a quantity of lines of code in a high-end vehicle is remarkably tens of millions to hundreds of millions, far exceeding 10 million lines of code in a BOEING aircraft. As a result, errors caused by software increase day by day, bringing great risks to driving safety. To reduce safety risks caused by software errors to vehicles, auto makers usually perform software upgrade in an offline recall mode. This not only increases costs of the auto makers, but also causes poor user experience because this affects normal vehicle use. Therefore, how to properly implement vehicle software upgrade has become a concern of many automobile enterprises.

To resolve problems of cost increase and poor user experience caused by offline recall, a vehicle software upgrade method based on an over-the-air (OTA) technology is proposed in a conventional technology. A latest software upgrade package is first downloaded for a vehicle from a vehicle software platform through a wireless communication network, and then upgrades vehicle software based on the software upgrade package. In this way, problems of cost increase and poor user experience caused by offline recall can be avoided. However, with diversity of software functions, a vehicle-mounted communication device needs to download an increasingly large software upgrade package through a wireless communication network, and a quantity of times of downloading also increases. Consequently, a user has increasingly high data traffic overheads. In addition, in an environment with a poor network signal, a communication signal of the vehicle is poor and unstable, and a plurality of software packages cannot be successfully downloaded in short time. Consequently, software upgrade cannot be implemented in a timely manner. Therefore, how to securely and conveniently upgrade vehicle software has become one of technical problems that need to be resolved urgently.

SUMMARY

Embodiments of this disclosure provide a software upgrade method and an apparatus. The method provided in embodiments of this disclosure can resolve problems such as high data traffic overheads and failure of timely software upgrade caused by reasons such as a poor network signal that exist when a first terminal device performs software upgrade based on an OTA technology. This can increase efficiency and security of software upgrade of the first terminal device, and improve user experience of the first terminal device.

According to a first aspect, an embodiment of this disclosure provides a software upgrade method. The method includes that a first terminal device receives OTA software upgrade information from a second terminal device, where the OTA software upgrade information includes a software upgrade package and OTA upgrade indication information, the first terminal device determines that the software upgrade package and the OTA upgrade indication information are generated by a first network device and provided to the second terminal device, and the first terminal device performs software upgrade based on the software upgrade package after determining, based on the OTA upgrade indication information, that the second terminal device has permission to perform OTA upgrade on the first terminal device.

In the method provided in this embodiment of this disclosure, when it is determined that the software upgrade package and the OTA upgrade indication information that are sent by the second terminal device to the first terminal device are provided by the first network device, the first terminal device performs software upgrade by using the software upgrade package only when the first terminal device determines, based on the OTA upgrade indication information, that the second terminal device has permission to perform OTA upgrade on the first terminal device. This can ensure security of software upgrade of the first terminal device. In addition, a manner in which the second terminal device forwards the upgrade package may be used to avoid problems such as high data traffic overheads and failure of timely software upgrade caused by reasons such as a poor network signal that exist when software upgrade is performed based on an OTA technology. This can increase efficiency and security of software upgrade of the first terminal device, and improve user experience of the first terminal device.

With reference to the first aspect, in a feasible implementation, the first terminal device verifies a first digital signature of the software upgrade package by using a first public key of the first network device, and/or the first terminal device verifies a second digital signature of the OTA upgrade indication information by using a second public key of the first network device. It is determined that the software upgrade package and/or the OTA upgrade indication information are/is generated by the first network device and provided to the second terminal device if the first terminal device determines that the first digital signature of the software upgrade package and/or the second digital signature of the OTA upgrade indication information are/is verified. Whether the software upgrade package and the OTA upgrade indication information come from the first network device can be accurately determined by using the public key of the first network device to perform verification on the digital signature of the software upgrade package and the OTA upgrade indication information. This can also ensure security of subsequent software upgrade.

With reference to the first aspect, in a feasible implementation, it is determined that the second terminal device has permission to perform OTA upgrade on the first terminal device if the first terminal device determines that the OTA upgrade indication information includes at least one of the following: first identification information of the first network device, second identification information of the second terminal device, third identification information of the first terminal device, and an OTA upgrade authorization identifier. A generator, sender, and receiver of the software upgrade package or a specific authorization identifier is used as the OTA upgrade indication information. This can ensure that the first terminal device can accurately determine, based on the OTA upgrade indication information, whether the second terminal device has permission to perform OTA upgrade on the first terminal device, and can further ensure security of software upgrade.

With reference to the first aspect, in a feasible implementation, the first terminal device sends the OTA upgrade indication information to the first network device. It is determined that the second terminal device has permission to perform OTA upgrade on the first terminal device if the first terminal device receives a permission verification success identifier sent by the first network device for the OTA upgrade indication information. The OTA upgrade indication information herein indicating that the second terminal device has permission to perform OTA upgrade on the first terminal device includes at least one of the following: first identification information of the first network device, second identification information of the second terminal device, third identification information of the first terminal device, and an OTA upgrade authorization identifier. The first network device herein assists in verifying whether the software upgrade package and the OTA upgrade indication information are generated by the first network device and provided to the second terminal device. This can save a computing resource of the first terminal device, and improve a data processing capability of the first terminal device.

With reference to the first aspect, in a feasible implementation, before the first terminal device determines, based on the OTA upgrade indication information, that the second terminal device has permission to perform OTA upgrade on the first terminal device, the first terminal device may determine that integrity verification on the software upgrade package and the OTA upgrade indication information succeeds.

With reference to the first aspect, in a feasible implementation, the software upgrade package includes upgrade subpackages corresponding to N2 functional modules in N1 functional modules of the first terminal device, where N2 is less than or equal to N1. The upgrade subpackages corresponding to the plurality of functional modules are sent together to the first terminal device, so that the first terminal device can simultaneously complete software upgrade of the plurality of functional modules, increasing efficiency of software upgrade of the first terminal device.

With reference to the first aspect, in a feasible implementation, the first terminal device may send upgrade completion indication information to the second terminal device. The upgrade completion indication information indicates that software upgrade of the N2 functional modules is completed, and includes software version information corresponding to the N2 upgraded functional modules.

According to a second aspect, an embodiment of this disclosure provides a software upgrade method. The method includes that a second terminal device receives a software upgrade package sent by a first network device, where the software upgrade package corresponds to a first digital signature determined by the first network device, the second terminal device receives OTA upgrade indication information sent by the first network device, where the OTA upgrade indication information indicates whether the second terminal device has OTA upgrade permission for a first terminal device, and the OTA upgrade indication information corresponds to a second digital signature determined by the first network device, and the second terminal device sends OTA software upgrade information to the first terminal device. The OTA software upgrade information includes the OTA upgrade indication information and the software upgrade package.

With reference to the second aspect, in a feasible implementation, before the second terminal device receives the OTA upgrade indication information sent by the first network device, the second terminal device sends an OTA upgrade permission verification request to the first network device. The OTA upgrade permission verification request is used to request the first network device to determine whether the second terminal device has permission to perform OTA upgrade on the first terminal device, and the OTA upgrade permission verification request includes third identification information of the first terminal device.

With reference to the second aspect, in a feasible implementation, the OTA upgrade indication information indicating that the second terminal device has permission to perform OTA upgrade on the first terminal device includes at least one of the following: first identification information of the first network device, second identification information of the second terminal device, the third identification information of the first terminal device, and an OTA upgrade authorization identifier.

With reference to the second aspect, in a feasible implementation, the software upgrade package includes upgrade subpackages corresponding to N2 functional modules in N1 functional modules of the first terminal device, where N2 is less than or equal to N1.

With reference to the second aspect, in a feasible implementation, the second terminal device receives upgrade completion indication information sent by the first terminal device, where the upgrade completion indication information indicates that software upgrade of the N2 functional modules is completed, and the upgrade completion indication information includes software version information corresponding to the N2 upgraded functional modules, and the second terminal device sends the upgrade completion indication information to the first network device.

According to a third aspect, an embodiment of this disclosure provides a software upgrade method. A first network device determines a software upgrade package corresponding to a first terminal device, the first network device determines OTA upgrade indication information, where the OTA upgrade indication information indicates whether a second terminal device has permission to perform OTA upgrade on the first terminal device, and the first network device sends the software upgrade package and the OTA upgrade indication information to the second terminal device.

With reference to the third aspect, in a feasible implementation, before determining the software upgrade package corresponding to the first terminal device, the first network device receives an upgrade package download request sent by the second terminal device. The upgrade package download request is used to request the first network device to provide the software upgrade package corresponding to the first terminal device to the second terminal device.

With reference to the third aspect, in a feasible implementation, the first network device receives OTA software update information from a second network device. The OTA software update information includes at least first software version information corresponding to N1 functional modules of the first terminal device and upgrade subpackages corresponding to the N1 functional modules. The first network device determines the software upgrade package of the first terminal device based on upgrade subpackages corresponding to N2 functional modules if the first network device determines that second software version information of the N2 functional modules in the N1 functional modules of the first terminal device is earlier than first software version information of the N2 functional modules included in the OTA software update information, where N2 is less than or equal to N1, and the software upgrade package corresponds to a first digital signature determined by the first network device.

With reference to the third aspect, in a feasible implementation, the first network device receives an OTA upgrade permission verification request sent by the second terminal device, and the OTA upgrade permission verification request includes at least third identification information of the first terminal device. The first network device generates, based on whether there is a binding relationship between the second terminal device and the first terminal device, the OTA upgrade indication information indicating whether the second terminal device has permission to perform OTA upgrade on the first terminal device. The OTA upgrade indication information corresponds to a second digital signature determined by the first network device.

With reference to the third aspect, in a feasible implementation, the OTA upgrade indication information indicating that the second terminal device has permission to perform OTA upgrade on the first terminal device includes at least one of the following: first identification information of the first network device, second identification information of the second terminal device, the third identification information of the first terminal device, and an OTA upgrade authorization identifier.

With reference to the third aspect, in a feasible implementation, the first network device receives the OTA upgrade indication information sent by the first terminal device, and the first network device sends a permission verification success identifier to the first terminal device if the first network device determines that the OTA upgrade indication information includes at least one of the following: the first identification information of the first network device, the second identification information of the second terminal device, the third identification information of the first terminal device, and the OTA upgrade authorization identifier.

According to a fourth aspect, an embodiment of this disclosure provides an apparatus. The apparatus may be a first terminal device, or may be an element or a module such as a chip inside the first terminal device. The apparatus includes units configured to perform the software upgrade method provided in any possible implementation of the first aspect. Therefore, beneficial effects (or advantages) of the software upgrade method provided in the first aspect can also be implemented.

According to a fifth aspect, an embodiment of this disclosure provides an apparatus. The apparatus may be a second terminal device, or may be an element or a module such as a chip inside the second terminal device. The apparatus includes units configured to perform the software upgrade method provided in any possible implementation of the second aspect. Therefore, beneficial effects (or advantages) of the software upgrade method provided in the second aspect can also be implemented.

According to a sixth aspect, an embodiment of this disclosure provides an apparatus. The apparatus may be a first network device, or may be an element or a module such as a chip inside the first network device. The apparatus includes units configured to perform the software upgrade method provided in any possible implementation of the third aspect. Therefore, beneficial effects (or advantages) of the software upgrade method provided in the third aspect can also be implemented.

According to a seventh aspect, an embodiment of this disclosure provides an apparatus. The apparatus may be a first terminal device, or may be an element or a module such as a chip inside the first terminal device. The apparatus includes a memory, a processor, and a transceiver. The processor is configured to invoke code stored in the memory, to perform the software upgrade method provided in any feasible implementation of the first aspect.

According to an eighth aspect, an embodiment of this disclosure provides an apparatus. The apparatus may be a second terminal device, or may be an element or a module such as a chip inside the second terminal device. The apparatus includes a memory, a processor, and a transceiver. The processor is configured to invoke code stored in the memory, to perform the software upgrade method provided in any feasible implementation of the second aspect.

According to a ninth aspect, an embodiment of this disclosure provides an apparatus. The apparatus may be a first network device, or may be an element or a module such as a chip inside the first network device. The apparatus includes a memory, a processor, and a transceiver. The processor is configured to invoke code stored in the memory, to perform the software upgrade method provided in any feasible implementation of the third aspect.

According to a tenth aspect, an embodiment of this disclosure provides a computer-readable storage medium. The computer-readable storage medium stores instructions. When the instructions are executed on a computer, the software upgrade method provided in any feasible implementation of the first aspect is implemented, and beneficial effects (or advantages) of the software upgrade method provided in the first aspect can also be implemented.

According to an eleventh aspect, an embodiment of this disclosure provides a computer-readable storage medium. The computer-readable storage medium stores instructions. When the instructions are executed on a computer, the software upgrade method provided in any feasible implementation of the second aspect is implemented, and beneficial effects (or advantages) of the software upgrade method provided in the second aspect can also be implemented.

According to a twelfth aspect, an embodiment of this disclosure provides a computer-readable storage medium. The computer-readable storage medium stores instructions. When the instructions are executed on a computer, the software upgrade method provided in any feasible implementation of the third aspect is implemented, and beneficial effects (or advantages) of the software upgrade method provided in the third aspect can also be implemented.

According to a thirteenth aspect, an embodiment of this disclosure provides a computer program product including instructions. When the computer program product runs on a computer, the computer is enabled to perform the software upgrade method provided in the first aspect, and beneficial effects of the software upgrade method provided in the first aspect can also be implemented.

According to a fourteenth aspect, an embodiment of this disclosure provides a computer program product including instructions. When the computer program product runs on a computer, the computer is enabled to perform the software upgrade method provided in the second aspect, and beneficial effects of the software upgrade method provided in the second aspect can also be implemented.

According to a fifteenth aspect, an embodiment of this disclosure provides a computer program product including instructions. When the computer program product runs on a computer, the computer is enabled to perform the software upgrade method provided in the third aspect, and beneficial effects of the software upgrade method provided in the second aspect can also be implemented.

According to a sixteenth aspect, an embodiment of this disclosure provides an apparatus. The apparatus is a first terminal device. The apparatus includes a processor and an interface circuit. The interface circuit is configured to receive code instructions and transmit the code instructions to the processor. The processor is configured to execute the code instructions to implement the software upgrade method provided in any feasible implementation of the first aspect, and beneficial effects (or advantages) of the software upgrade method provided in the first aspect can also be implemented.

According to a seventeenth aspect, an embodiment of this disclosure provides an apparatus. The apparatus is a second terminal device. The apparatus includes a processor and an interface circuit. The interface circuit is configured to receive code instructions and transmit the code instructions to the processor. The processor is configured to execute the code instructions to implement the software upgrade method provided in any feasible implementation of the second aspect, and beneficial effects (or advantages) of the software upgrade method provided in the second aspect can also be implemented.

According to an eighteenth aspect, an embodiment of this disclosure provides an apparatus. The apparatus is a first network device. The apparatus includes a processor and an interface circuit. The interface circuit is configured to receive code instructions and transmit the code instructions to the processor. The processor is configured to execute the code instructions to implement the software upgrade method provided in any feasible implementation of the third aspect, and beneficial effects (or advantages) of the software upgrade method provided in the third aspect can also be implemented.

According to a nineteenth aspect, an embodiment of this disclosure provides a communication system. The communication system includes the apparatuses described in the third aspect, the fourth aspect, and the fifth aspect, the apparatuses described in the seventh aspect, the eighth aspect, or the ninth aspect, or the apparatuses described in the sixteenth aspect, the seventeenth aspect, and the eighteenth aspect.

The method provided in embodiments of this disclosure can resolve problems such as high data traffic overheads and failure of timely software upgrade caused by reasons such as a poor network signal that exist when a first terminal device performs software upgrade based on an OTA technology. This can increase efficiency and security of software upgrade of the first terminal device, and improve user experience of the first terminal device.

DESCRIPTION OF EMBODIMENTS

The following clearly and describes the technical solutions in embodiments of this disclosure with reference to the accompanying drawings in embodiments of this disclosure.

Figure 1:
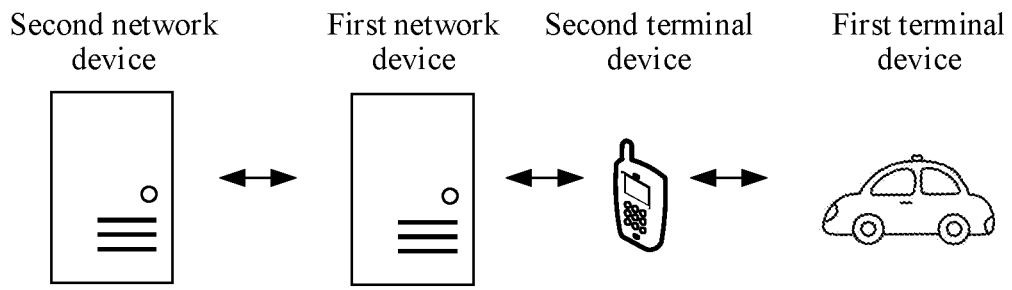
FIG. 1 is a schematic diagram depicting a structure of a communication system according to an embodiment of this disclosure.

Embodiments of this disclosure provide a software upgrade method and an apparatus. Refer to FIG. 1. FIG. 1 is a schematic diagram depicting a structure of a communication system according to an embodiment of this disclosure. The software upgrade method is applicable to the communication system. As shown in FIG. 1, the communication system mainly includes a first terminal device, a second terminal device, a first network device, and a second network device. The first terminal device is a terminal device that requires software upgrade. The first terminal device may be a cellular phone, a cordless phone, a Session Initiation Protocol (SIP) phone, a personal digital assistant (PDA), a handheld device, a wearable device, or the like with a wireless communication function, or may be a vehicle-mounted device, a roadside unit, or the like. This is not limited in this disclosure. The second terminal device is a unit configured to obtain information related to software upgrade from the first network device, and forward the information to the first terminal device. During specific implementation, the second terminal device is usually a device in an environment with good communication quality. The second terminal device may be a cellular phone, a cordless phone, a handheld device with a wireless communication function, a computing device, another processing device connected to a wireless modem, or the like. This is not limited in this disclosure. The first network device is a device configured to perform scheduling, configuration, or upgrade information push for software upgrade of the first terminal device. During specific implementation, the first network device may be a physical server, a cloud server, or the like that is provided by a manufacturer or distributor of the first terminal device and that is for software upgrade. The second network device is a device configured to update and iterate a software code version, and provide the first network device with specific content such as a software upgrade package and software version information. During specific implementation, the second network device may be a physical server, a cloud server, or the like that is provided by a software vendor or distributor. It should be noted that, in a case in which a generator of some software is an operating agency of the first terminal device, the first network device and the second network device may be a same physical server or a same cloud server.

Generally, the manufacturer or the distributor of the first terminal device upgrades software of the first terminal device based on an OTA technology. Further, the first terminal device downloads a latest software upgrade package from the first network device through the wireless communication network and upgrades the software. However, with diversity of software functions, the first terminal device needs to download an increasingly large software upgrade package through a wireless communication network, and a quantity of times of downloading also increases. Consequently, a user of the first terminal device faces increasingly high data traffic overheads. In addition, in an environment with a poor network signal, a communication signal of the first terminal device is poor and unstable, and a plurality of software packages cannot be successfully downloaded in short time. Consequently, software upgrade cannot be implemented in a timely manner. Therefore, how to securely and conveniently upgrade vehicle software has become one of technical problems that need to be resolved urgently.

A technical problem to be resolved by the software upgrade method provided in embodiments of this disclosure is how to securely and conveniently implement software upgrade of the first terminal device, to reduce costs of software upgrade and increase efficiency of software upgrade.

Embodiment 1

Figure 2:
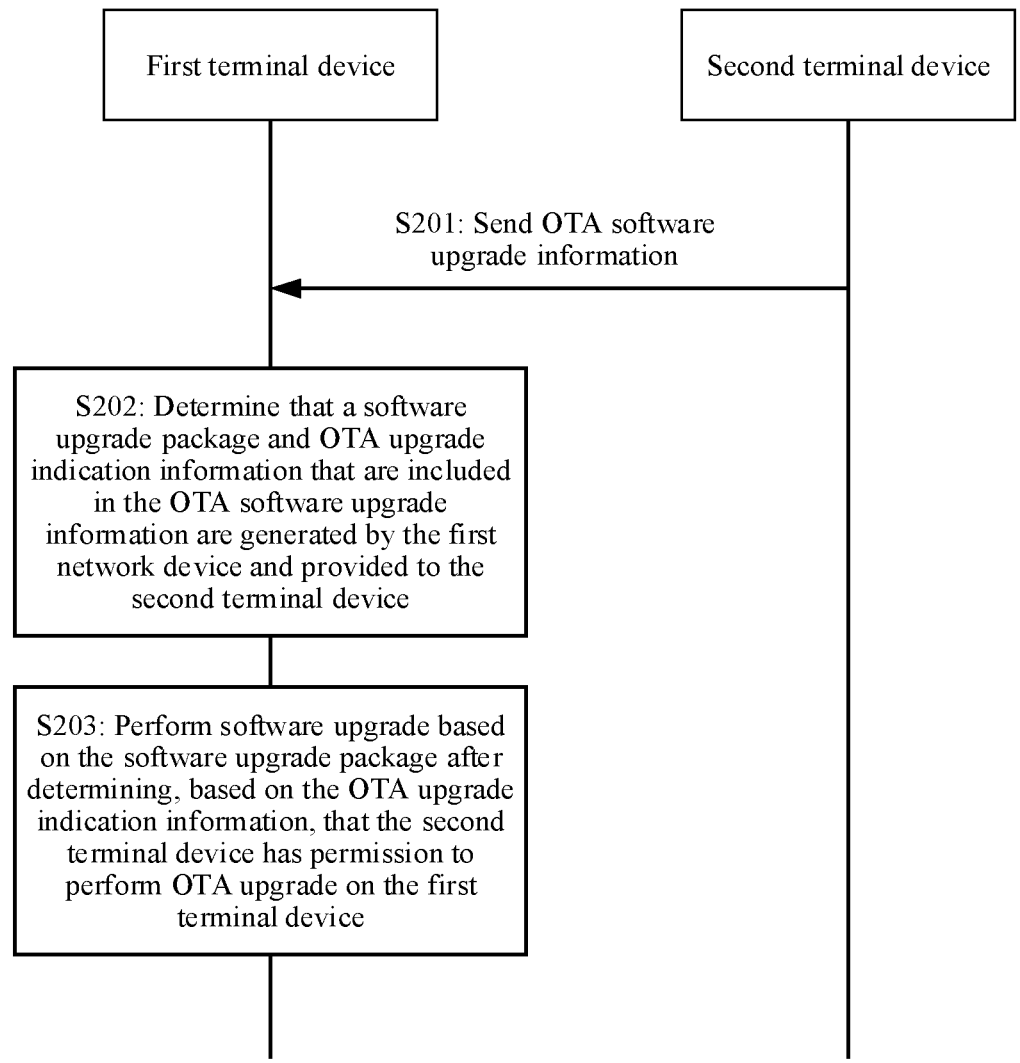
FIG. 2 is a schematic flowchart of a software upgrade method according to an embodiment of this disclosure.

Refer to FIG. 2. FIG. 2 is a schematic flowchart of a software upgrade method according to an embodiment of this disclosure. For ease of understanding and description, in this embodiment, the software upgrade method provided in this disclosure is described in detail by using a software upgrade scenario of a functional module in a vehicle as an example. A first terminal device herein is a vehicle, a second terminal device is a mobile terminal, a first network device is an automobile enterprise platform launched by a manufacturer or distributor of the vehicle, and a second network device is a software service platform (for example, an OTA server) launched by a vehicle software vendor or distributor. An application program that can exchange information with the first network device should be installed on the second terminal device. As shown in FIG. 2, the software upgrade method includes the following steps.

S201: The second terminal device sends OTA software upgrade information to the first terminal device.

In some feasible implementations, after a communication connection is established between the first terminal device and the second terminal device and at least one communication link with a secure channel is configured, the first terminal device may obtain the OTA software upgrade information from the second terminal device through the at least one communication link. The communication connection may be established between the first terminal device and the second terminal device in a wired or wireless manner. This is not limited in this embodiment of this disclosure. The secure channel is calculated by the first terminal device and the second terminal device based on security information known to and shared by the first terminal device and the second terminal device and in combination with a corresponding security processing method, and is a means of encrypting content of communication when the first terminal device and the second terminal device communicate with each other. The secure channel may include a Transport Layer Security (TLS) protocol, a Secure Sockets Layer (SSL), and the like. This is not limited in this disclosure. In addition, it should be noted that the OTA software upgrade information is mainly used by the second terminal device to request to perform software upgrade for one or more functional modules in the first terminal device. The OTA software upgrade information may include a software upgrade package and OTA upgrade indication information. The software upgrade package may be used by the first terminal device for software upgrade. The OTA upgrade indication information may indicate whether the second terminal device has permission to perform OTA upgrade on the first terminal device.

Optionally, before the first terminal device receives the OTA software upgrade information from the second terminal device, some basic information may be configured and shared between the first terminal device, the second terminal device, and the first network device, to ensure a smooth subsequent OTA software upgrade. For example, for the first terminal device, basic information such as third identification information, terminal device type information, and a module identifier corresponding to each of a plurality of functional modules included in the first terminal device, and current software version information of each functional module may be predefined or pre-provisioned (for example, provisioned by the first network device for the first terminal device). For example, the module identifier corresponding to each functional module and the current software version information of each functional module may be further an array [modID1,3.3.5, modID2,3.1.1, modID3,2.1.2, . . . ]. The array means that a current software version of a first functional module (a module identifier is modID1) in the first terminal device is 3.3.5, a current software version of a second functional module (a module identifier is modID2) is 3.1.1, and a current software version of a third functional module (a module identifier is modID3) is 2.1.2. The first terminal device shares the basic information with the second terminal device and the first network device, so that the first network device and the second terminal device can perform software upgrade on the first terminal device based on the basic information. For the second terminal device, after installing the application program that is released by the first network device and used to manage the first terminal device, the second terminal device may establish the secure channel with the first network device through the application program. During actual application, after a user of the second terminal device registers an account on the application program, the first network device allocates an application program identifier to the user through the application program. The application program identifier is bound to the account registered by the user of the second terminal device, so that after the user logs in to the account through an application program installed on another terminal device other than the second terminal device, the first network device may also determine, based on the application program identifier, that the other terminal device is authorized. Therefore, a new secure channel can also be established between the first network device and the other terminal device. After obtaining the foregoing application program identifier, the second terminal device may further share the application program identifier with the first terminal device. Optionally, the application program identifier may be a universally unique identifier (UUID) allocated by the first network device to the application program. Further, if the first terminal device establishes a binding relationship with the second terminal device, the first terminal device or the second terminal device may report the binding relationship to the first network device, so that the first network device may subsequently determine whether the second terminal device has permission to perform OTA upgrade on the first terminal device. Certainly, it may be understood that the first terminal device, the second terminal device, and the first network device may share a set of or a plurality of pre-defined public keys with each other, to ensure security of information transfer between each other, and to implement encryption or decryption in a process of information transmission between each other.

Further, in a possible specific implementation, before the first terminal device, the second terminal device, and the first network device share some basic information, the second terminal device may first send a binding request to the first network device. The binding request includes at least the third identification information of the first terminal device and second identification information of the second terminal device. Optionally, the second identification information may be the application program identifier mentioned above. After receiving the binding request, the first network device may determine, based on whether the first terminal device and the second terminal device belong to a same user, whether the first terminal device and the second terminal device can be bound. Further, the first network device may fetch user information of the first terminal device (or first user information) and second user information of the second terminal device (or second user information) from a pre-provisioned user information database of the first network device. Optionally, the first user information may be information such as a personal identification (ID) card number or a home address that is uploaded to the automobile enterprise platform by a user when the user installs, on the first terminal device, the application program released by the first network device. The second user information may be information such as a personal ID card number or a home address that is uploaded by a user to the first network device through a distributor of the second terminal device when the user purchases or rents the second terminal device. Then, the first network device may determine whether the first user information matches the second user information. If the first network device determines that the first user information matches the second user information, it may be determined that the first terminal device and the second terminal device can be bound. If the first network device determines that the first user information does not match the second user information, it may be determined that the first terminal device and the second terminal device cannot be bound. If the first network device determines that the first terminal device and the second terminal device can be bound, the first network device may associate the second identification information with the third identification information to generate binding relationship information corresponding to the first terminal device and the second terminal device, and store the binding relationship information in a binding relationship set. The binding relationship set includes one or more groups of binding relationship information, and each group of binding relationship information indicates a binding relationship between a first terminal device and a second terminal device. Then, the first network device may separately send binding response information to the first terminal device and the second terminal device, to notify the first terminal device and the second terminal device that the first terminal device and the second terminal device complete binding. After receiving the binding response information, the first terminal device may establish secure near field communication with the second terminal device. Optionally, after receiving the binding response information, the first terminal device may further report current software version information of one or more functional modules of the first terminal device to the first network device, so that the first network device can subsequently generate a software upgrade package of the first terminal device.

In another possible specific implementation, before the first terminal device, the second terminal device, and the first network device share some basic information, the second terminal device may alternatively first send a binding request to the first network device. The binding request includes at least the third identification information of the first terminal device and second identification information of the second terminal device. After receiving the binding request, the first network device may determine, based on whether the first terminal device and the second terminal device belong to a same user, whether the first terminal device and the second terminal device can be bound. For a specific process in which the first network device determines, based on whether the first terminal device and the second terminal device belong to the same user, whether the first terminal device and the second terminal device can be bound, refer to the foregoing description. Details are not described herein again. If the first network device determines that the first terminal device and the second terminal device cannot be bound, the first network device may send binding rejection information to the first terminal device, to notify the second terminal device that the second terminal device cannot be bound to the first terminal device. Alternatively, the first network device may not feed back any information to the second terminal device. If the first network device determines that the first terminal device and the second terminal device can be bound, the first network device may feed back a piece of first binding response information to the second terminal device. The first binding response information includes at least a piece of binding indication information. The binding indication information includes one or more of the second identification information of the second terminal device, the third identification information of the first terminal device, first identification information of the first network device, and a binding identifier. In addition, the binding indication information further corresponds to a fourth digital signature, and the fourth digital signature is generated by the first network device for the binding indication information based on a pre-provisioned fourth private key of the first network device. After receiving the first binding response information, the second terminal device may send second binding response information to the first terminal device. The second binding response information includes at least the second identification information of the second terminal device, the binding indication information, and the fourth digital signature corresponding to the binding indication information. After receiving the second binding response information, if the first terminal device determines, based on the fourth public key corresponding to the fourth private key of the first network device, that signature verification on the third digital signature succeeds, it may be determined that integrity verification on the third digital signature succeeds. Certainly, it may be understood that the first network device may alternatively perform integrity verification in another manner. This is not limited in this embodiment of this disclosure. Then, if the first terminal device determines that the binding indication information includes one or more of the second identification information of the second terminal device, the third identification information of the first terminal device, the first identification information of the first network device, and the binding identifier, it may be determined that the first terminal device can be bound to the second terminal device. After determining that the first terminal device can be bound to the second terminal device, the first terminal device may establish secure near field communication with the second terminal device. Optionally, the first terminal device may further report current software version information of one or more functional modules of the first terminal device to the first network device, so that the first network device can subsequently generate a software upgrade package of the first terminal device.

Figure 3A:
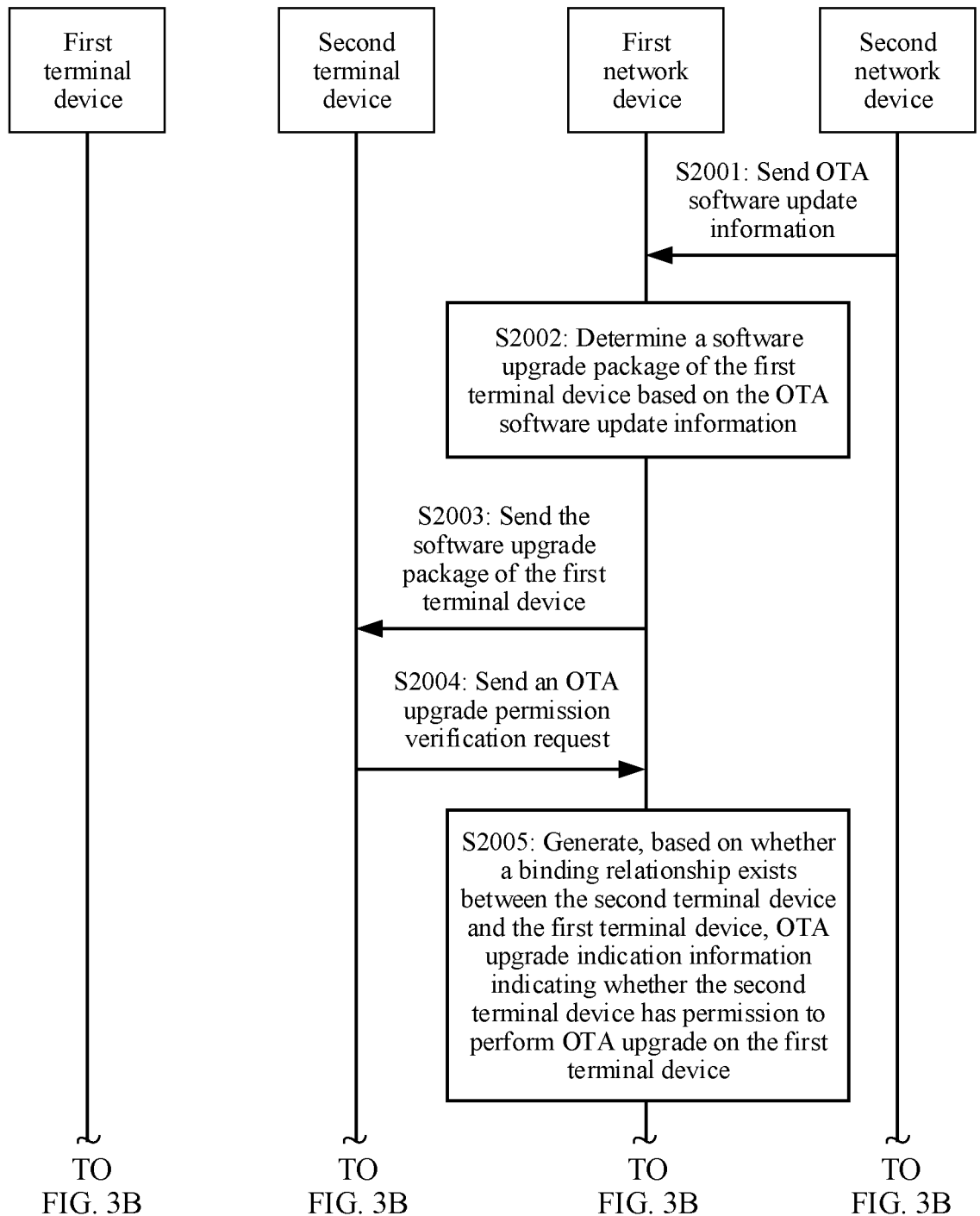
FIG. 3A and FIG. 3B are another schematic flowchart of a software upgrade method according to an embodiment of this disclosure.
Figure 3B:
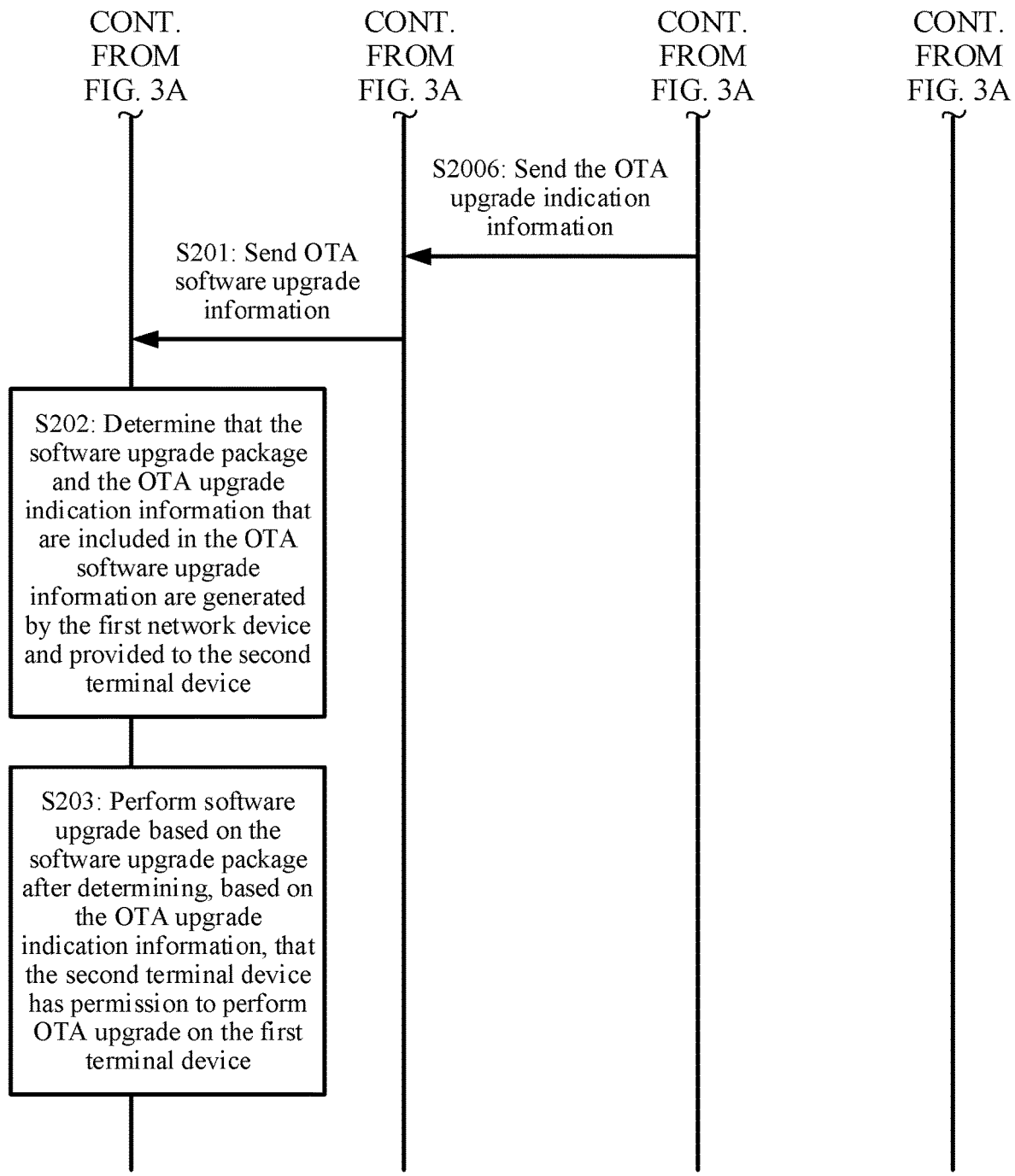

Optionally, refer to FIG. 3A and FIG. 3B. FIG. 3A and FIG. 3B are another schematic flowchart of a software upgrade method according to an embodiment of this disclosure. It can be learned from FIG. 3A and FIG. 3B that before step S201, the method may further include steps S2001 to S2006.

S2001: The second network device sends OTA software update information to the first network device.

In some feasible implementations, when finding that software of a functional module of the first terminal device has a defect or has a to-be-added new function, a software vendor develops a corresponding upgrade, performs a corresponding upgrade operation on the software of the functional module, and generates a new software version. Then, the software vendor may further release corresponding OTA software update information to the first network device by using the second network device, to prompt the first network device that the software of the functional module of the first terminal device needs to be updated.

In a feasible implementation, the OTA software update information may include one or more types of first terminal device types and latest software versions of N1 functional modules corresponding to each first terminal type. It should be noted herein that the first terminal device described above belongs to a first terminal device type. For example, a vehicle type to which a vehicle A belongs may be a first vehicle type. During specific implementation, refer to Table 1-1. Table 1-1 is a list of OTA software update information provided in this embodiment of this disclosure. It is assumed herein that the first terminal device is a vehicle. As shown in Table 1-1, the OTA software update information includes four first terminal device types (that is, vehicle models): a first vehicle type, a second vehicle type, a third vehicle type, and a fourth vehicle type. For the first vehicle type, software of all of a functional module 1, a functional module 2, and a functional module 3 needs to be updated. A latest software version of the functional module 1 is 3.1.2, a latest software version of the functional module 2 is 2.3.5, and a latest software version of the functional module 3 is 2.4.1. Similarly, Table 1-1 may further indicate that software of each functional module of the three vehicle models: the second vehicle type, the third vehicle type, and the fourth vehicle type also need to be updated. Details are not described again.

TABLE 1-1

| Vehicle type | Functional module 1 (modID1) | Functional module 2 (modID2) | Functional module 3 (modID3) |
|---|---|---|---|
| First vehicle type | 3.1.2 | 2.3.5 | 2.4.1 |
| Second vehicle type | 3.1.0 | 2.3.5 | 2.4.1 |
| Third vehicle type | 3.2.3 | 2.3.1 | 2.4.3 |
| Fourth vehicle type | 3.1.7 | 2.2.5 | 2.4.3 |

In another feasible implementation, the OTA software update information sent by the second network device to the first network device includes not only the one or more types of the first terminal device types and the latest software versions of the N1 functional modules corresponding to each first terminal type, but also N1 upgrade subpackages needed by the N1 functional modules for software update. For example, refer to content in Table 1-1. The OTA software update information may further include three upgrade subpackages corresponding to the functional module 1, the functional module 2, and the functional module 3 of the vehicle of the first vehicle type. The upgrade subpackage is sent when the software version information is sent, so that a subsequent request made again by the first network device for the upgrade subpackage can be avoided, and efficiency of information exchange can be increased.

S2002: The first network device determines a software upgrade package corresponding to the first terminal device based on the OTA software update information.

S2003: The first network device sends the software upgrade package of the first terminal device to the second terminal device.

In some feasible implementations, after the first network device receives the OTA software update information sent by the second network device, a functional module that requires software upgrade in the first terminal device may be determined based on the OTA software update information and current software version information of each functional module of the first terminal device (or a to-be-upgraded functional module). Then, the software upgrade package corresponding to the first terminal device is determined based on the upgrade subpackages of the to-be-upgraded functional modules.

In the following, it is assumed that the first terminal device is the vehicle A (third identification information corresponding to the vehicle A is A), and a first terminal device type corresponding to the vehicle A is the first vehicle type. After receiving the OTA software update information, the first network device may fetch, from the OTA software update information based on the vehicle type of the vehicle A, functional modules corresponding to the vehicle type of the vehicle A and latest software version information of the functional modules, that is, the vehicle type is the first vehicle type, the current latest software version of the corresponding functional module 1 is 3.1.2, the current latest software version of the functional module 2 is 2.3.5, and the current latest software version of the functional module 3 is 2.4.1. Then, the first network device may compare a current software version of each functional module in the vehicle A that is shared by the vehicle A with the latest software versions of the functional module 1, the functional module 2, and the functional module 3 corresponding to the first vehicle type. It is assumed herein that the current software version of the functional module 1 of the vehicle A is 3.1.2, the current software version of the functional module 2 is 2.3.1, and the current software version of the functional module 3 is 2.4.0. If the first network device determines that current software version information of the functional module 2 and the functional module 3 of the vehicle A is earlier than the latest software versions of the functional module 2 and the functional module 3 that correspond to the first vehicle type and that are included in the OTA software update information, the first network device may determine that the functional module 2 and the functional module 3 of the vehicle A need to be updated, that is, the functional module 2 and the functional module 3 are to-be-updated functional modules.

In an implementation, if the OTA software update information includes the one or more types of the first terminal device types, the latest software versions of the N1 functional modules corresponding to each first terminal type, and the upgrade subpackages of the N1 functional modules, after determining that the first terminal device has a plurality of to-be-updated functional modules (it is assumed herein that N2 functional modules are to be updated), the first network device may first send a piece of OTA notification information to the second terminal device. The OTA notification information indicates to the second terminal device that the first terminal device has a to-be-updated functional module, and the OTA notification information includes at least the third identification information of the first terminal device. After receiving the OTA notification information, if the second terminal device determines that the second terminal device is in a good network environment (for example, in WI-FI coverage or with access to a hotspot) and has a capability of pushing a software upgrade package to the first terminal device, the second terminal device may send an upgrade package download request to the first network device. The upgrade package download request includes at least the third identification information of the first terminal device, and the upgrade package download request indicates the first network device to determine and send the software upgrade package corresponding to the first terminal device to the second terminal device. After receiving the upgrade package download request, the first network device may form a software upgrade package of the first terminal device based on N2 upgrade subpackages that correspond to the N2 to-be-updated functional modules of the first terminal device and that are included in the OTA software update information. In addition, the first network device may further generate a digital signature (or a first digital signature) of the software upgrade package based on a pre-provisioned private key of the first network device (or a first private key). It should be noted that, a digital signature of a file is generally an integral part of the file. In other words, a digital signature of a file is included in the file. For example, the first digital signature of the software upgrade package is included in the software upgrade package. This is the same in the following, and details are not described again. Then, the first network device may send both the software upgrade package and the first digital signature to the second terminal device. In this manner, when determining that the second terminal device is in a good network environment and has an OTA upgrade capability, the first network device pushes the software upgrade package of the first terminal device to the second terminal device. This can ensure that the second terminal device can subsequently correctly receive the software upgrade package, avoid problems such as failure of timely and correct transmission of the software upgrade package due to factors such as a poor network environment.

In another implementation, if the OTA software update information includes the one or more types of the first terminal device types, the latest software versions of the N1 functional modules corresponding to each first terminal type, and the upgrade subpackages of the N1 functional modules, after determining that the first terminal device has a plurality of to-be-updated functional modules (it is assumed herein that N2 functional modules are to be updated), the first network device may directly form a software upgrade package of the first terminal device based on N2 upgrade subpackages that correspond to the N2 to-be-updated functional modules of the first terminal device and that are included in the OTA software update information, and generate a first digital signature of the software upgrade package based on a pre-provisioned first private key of the first network device. Then, the first network device may first send OTA notification information including the software upgrade package and the first digital signature to the second terminal device, to indicate to the second terminal device that the first terminal device has a to-be-updated functional module, and provide the needed software upgrade package. In this manner, when determining that the first terminal device has a to-be-updated functional module, the first network device directly pushes, to the second terminal device, the software upgrade package used by the first terminal device for software upgrade. This can avoid an upgrade delay caused by excessive interactions between the first terminal device and the second terminal device, and can effectively increase efficiency of obtaining the software upgrade package by the second terminal device.

In still another implementation, if the OTA software update information includes only the one or more types of the first terminal device types and the latest software versions of the N1 functional modules corresponding to each first terminal type, when determining that the first terminal device has N2 to-be-updated functional modules, the first network device may send a piece of OTA notification information to the second terminal device, to indicate to the second terminal device that the first terminal device requires software upgrade. After receiving the OTA notification information, if the second terminal device determines that the second terminal device is in a good network environment and has a capability of pushing a software upgrade package to the first terminal device, the first terminal device may feed back an upgrade package download request to the first network device. The upgrade package download request includes at least the third identification information of the first terminal device. After receiving the upgrade package download request, the first network device may determine a first terminal device type to which the first terminal device belongs (or a target type) and the N2 to-be-upgraded functional modules corresponding to the first terminal device, and send an upgrade package obtaining request to the second network device. The upgrade package obtaining request includes at least the target type and module identifiers of the N2 to-be-upgraded functional modules. After receiving the upgrade package obtaining request, the second network device may determine a software upgrade package based on the target type and the module identifiers of the N2 to-be-upgraded functional modules, and send the software upgrade package to the first network device. The software upgrade package includes N2 upgrade subpackages corresponding to the N2 to-be-upgraded functional modules of the first terminal device, and the software upgrade package further includes a third digital signature generated by the second network device based on a third private key corresponding to the second network device. Then, the first network device may perform integrity verification on the software upgrade package based on a third public key corresponding to the third private key. During specific implementation, the first network device may perform signature verification on the third digital signature based on the third public key corresponding to the third private key. If the first network device determines that the third digital signature is verified, it may be determined that integrity verification on the software upgrade package succeeds. Certainly, it may be understood that the first network device may alternatively perform, in another manner, integrity verification on the software upgrade package sent by the second network device. This is not limited in this embodiment of this disclosure. After determining that integrity verification on the software upgrade package succeeds, the first network device may generate a first digital signature corresponding to the software upgrade package based on a pre-provisioned first private key of the first network device, and send the software upgrade package and the first digital signature to the second terminal device.

Optionally, during specific implementation, after determining the software upgrade package of the second terminal device and the first digital signature included in the software upgrade package, the first network device may send a uniform resource locator (URL) to the second terminal device. The URL indicates a resource location and a resource access manner of the software upgrade package and the first digital signature in the first network device or a third network device connected to the first network device. After receiving the URL, the second terminal device may download the software upgrade package from the first network device or the third network device through the URL. It should be noted that the third network device may be a server or a cloud server for storing upgrade packages. After generating some software upgrade packages, the first network device sends the software upgrade packages to the third network device, and obtains URLs that indicate resource locations and resource access manners of the software upgrade packages.

S2004: The second terminal device sends an OTA upgrade permission verification request to the first network device.

In some feasible implementations, after receiving the software upgrade package and the first digital signature that are sent by the first network device, and when determining that the integrity verification on the software upgrade package and the first data signature succeeds, the second terminal device may send the OTA upgrade permission verification request to the first network device. The OTA upgrade permission verification request may include the third identification information of the first terminal device and the second identification information of the second terminal device. Herein, the second identification information of the second terminal device indicates whether the second terminal device has permission to perform OTA upgrade on the first terminal device. The OTA upgrade permission verification request indicates the first network device to verify whether the second terminal device has permission to perform OTA upgrade on the first terminal device.

S2005: The first network device generates, based on whether there is a binding relationship between the second terminal device and the first terminal device, the OTA upgrade indication information indicating whether the second terminal device has permission to perform OTA upgrade on the first terminal device.

In some feasible implementations, after receiving the OTA upgrade permission verification request, the first network device may fetch the third identification information of the first terminal device and the second identification information of the second terminal device that are included in the OTA upgrade permission verification request. Then, the first network device may query the pre-provisioned binding relationship set of the first network device based on the third identification information and the second identification information. If the first network device finds the third identification information and the second identification information in the binding relationship set, and determines that there is a binding relationship between the third identification information and the second identification information (that is, there is a binding relationship between the first terminal device and the second terminal device), it may be determined that the second terminal device has permission to perform OTA upgrade on the first terminal device. If the first network device does not find the third identification information and the second identification information in the binding relationship set (that is, there is no binding relationship between the first terminal device and the second terminal device), it may be determined that the second terminal device does not have permission to perform OTA upgrade on the first terminal device. When determining that there is no binding relationship between the first terminal device and the second terminal device, the first network device may generate OTA upgrade indication information (or first OTA upgrade indication information) indicating that the second terminal device does not have permission to perform OTA upgrade on the first terminal device. When determining that a binding relationship existing between the first terminal device and the second terminal device, the first network device may generate second OTA upgrade indication information indicating that the second terminal device has permission to perform OTA upgrade on the first terminal device.

In an optional implementation, the first OTA upgrade indication information indicating that the second terminal device has permission to perform OTA upgrade on the first terminal device includes at least one of the following: the first identification information of the first network device, the second identification information of the second terminal device, the third identification information of the first terminal device, and an OTA upgrade authorization identifier. Information included in the first OTA upgrade indication information indicates that a generator of the first OTA upgrade indication information is the first network device, a user of the first OTA upgrade indication information is the second terminal device, and a receiver of the first OTA upgrade indication information is the first terminal device. The first OTA upgrade indication information indicating that the second terminal device does not have permission to perform OTA upgrade on the first terminal device does not include any one of the first identification information, the second identification information, the third identification information, and the OTA upgrade authorization identifier. It should be noted herein that the OTA upgrade authorization identifier is a fixed identifier, and has only one state. For example, assuming that the OTA upgrade authorization identifier is one bit, a bit value corresponding to the bit is fixed.

In another feasible implementation, the OTA upgrade authorization identifier has at least two states, including a first state and a second state. For example, assuming that the OTA upgrade authorization identifier is one bit, a bit value of the OTA upgrade authorization identifier in the first state is 1, and a bit value of the OTA upgrade authorization identifier in the second state is 0. The second OTA upgrade indication information indicating that the second terminal device has permission to perform OTA upgrade on the first terminal device may include only an OTA upgrade authorization identifier in the first state, and the first OTA upgrade indication information indicating that the second terminal device does not have permission to perform OTA upgrade on the first terminal device may include only an OTA upgrade authorization identifier in the second state.

In still another feasible implementation, the second OTA upgrade indication information may include all of the first identification information, the second identification information, and the third identification information at the same time. The first OTA upgrade indication information does not include all of the first identification information, the second identification information, and the third identification information at the same time.

In yet another feasible implementation, the first network device may further indicate, by feeding back whether the OTA upgrade indication information is null, whether the second terminal device has permission to perform OTA upgrade on the first terminal device. For example, when determining that there is a binding relationship between the first terminal device and the second terminal device, the first network device may generate a piece of OTA upgrade indication information (that is, the foregoing second OTA upgrade indication information). Content further included in the OTA upgrade indication information is not limited. When determining that there is no binding relationship between the first terminal device and the second terminal device, the first network device may generate OTA upgrade indication information that does not include any content (that is, the foregoing first OTA upgrade indication information).

Certainly, it may be understood that the first network device may further indicate, based on different combinations of the first identification information, the second identification information, the third identification information, and the OTA upgrade authorization identifier, whether the second terminal device has permission to perform OTA upgrade on the first terminal device. This is not limited in this embodiment of this disclosure. Herein, a generator, sender, and receiver of the software upgrade package or a specific authorization identifier is used as the OTA upgrade indication information. This can ensure that the first terminal device can accurately determine, based on the OTA upgrade indication information, whether the second terminal device has permission to perform OTA upgrade on the first terminal device, and can further ensure security of software upgrade.

Further, after generating the first OTA upgrade indication information or the second OTA upgrade indication information, the first network device may further generate a second digital signature for the first OTA upgrade indication information or the second OTA upgrade indication information based on a pre-provisioned second private key of the first network device. The second digital signature mainly indicates that the first OTA upgrade indication information or the second OTA upgrade indication information is generated by the first network device. The first network device marks the first OTA upgrade indication information or the second OTA upgrade indication information by using the second digital signature, so that the first terminal device can subsequently accurately identify whether upgrade permission verification on the second terminal device succeeds. This ensures that the first terminal device can subsequently perform software upgrade based on a secure second terminal device, improving security of software upgrade.

S2006: The first network device sends the OTA upgrade indication information to the second terminal device.

In some feasible implementations, after generating the first OTA upgrade indication information or the second OTA upgrade indication information and the second digital signature, the first network device may send the first OTA upgrade indication information or the second OTA upgrade indication information and the second digital signature to the second terminal device.

It should be noted herein that the foregoing step S2003 and subsequent steps S2004, S2005, and S2006 are not subject to a specific time sequence. In other words, the first network device may first perform step S2004, step S2005, and step S2006, and then perform step S2003, or may first perform step S2003, and then perform step S2004, step S2005, and step S2006. This is not limited in this disclosure.

S202: The first terminal device determines that the software upgrade package and the OTA upgrade indication information that are included in the foregoing OTA software upgrade information are generated by the first network device and provided to the second terminal device.

In some feasible implementations, after receiving the OTA software upgrade information sent by the second terminal device, the first terminal device may extract the software upgrade package and the OTA upgrade indication information from the foregoing OTA software upgrade information. Then, the first terminal device may first perform, based on the second public key corresponding to the second private key, signature verification on the second digital signature corresponding to the OTA upgrade indication information. Further, the first terminal device may first decrypt the second digital signature by using the second public key to generate a digest (or a first digest). Then, the first terminal device may process the OTA upgrade indication information by using a hash algorithm used when the first network device generates the second digital signature, to obtain a digest corresponding to the OTA upgrade indication information (or a second digest). If the first terminal device determines that the first digest is the same as the second digest, it may be determined that signature verification on the second digital signature succeeds, and that integrity verification on the OTA upgrade indication information succeeds. In addition, the first terminal device may also determine that the OTA upgrade indication information is generated by the first network device and provided to the second terminal device. Similarly, the first terminal device may further perform signature verification on the first digital signature corresponding to the software upgrade package by using the first public key corresponding to the first private key. If the first terminal device determines that the first digital signature is verified, it may be determined that integrity verification on the software upgrade package succeeds, and that the software upgrade package is generated by the first network device and is provided to the second terminal device. For a specific process of signature verification, refer to the process of signature verification on the second digital signature by the first terminal device. Details are not described herein again.

Optionally, when quality of communication between the first terminal device and the first network device is good, after receiving the software upgrade package and the OTA upgrade indication information, the first terminal device may further forward the software upgrade package and the OTA upgrade indication information to the first network device, and the first network device verifies whether the software upgrade package and the OTA upgrade indication information are determined by the first network device and provided to the second terminal device. For a specific verification process, refer to the foregoing process in which the first terminal device verifies whether the software upgrade package and the OTA upgrade indication information are generated by the first network device and provided to the second terminal device. Details are not described herein again. The first network device assists in verifying whether the software upgrade package and the OTA upgrade indication information are generated by the first network device and provided to the second terminal device. This can save a computing resource of the first terminal device, and improve a data processing capability of the first terminal device.

S203: The first terminal device performs software upgrade based on the software upgrade package after determining, based on the OTA upgrade indication information, that the second terminal device has permission to perform OTA upgrade on the first terminal device.

In some feasible implementations, if the first terminal device determines that the software upgrade package and the OTA upgrade indication information are determined by the first network device and provided to the second terminal device, the first terminal device may determine, based on specific content included in the OTA upgrade indication information, whether the second terminal device has permission to perform OTA upgrade on the first terminal device.

During specific implementation, different from the implementation in which the first network device indicates whether the second terminal device has permission to perform OTA upgrade on the first terminal device, the first terminal device may also determine, based on the OTA upgrade indication information and different implementations, whether the second terminal device has permission to perform OTA upgrade on the first terminal device.

For example, if the first terminal device determines that the OTA upgrade indication information includes at least one of the following: the first identification information of the first network device, the second identification information of the second terminal device, the third identification information of the first terminal device, and the OTA upgrade authorization identifier, it may be determined that the second terminal device has permission to perform OTA upgrade on the first terminal device. If the first terminal device determines that the OTA upgrade indication information does not include at least one of the following: the first identification information of the first network device, the second identification information of the second terminal device, the third identification information of the first terminal device, and the OTA upgrade authorization identifier, it may be determined that the second terminal device does not have permission to perform OTA upgrade on the first terminal device. Herein, the OTA upgrade authorization identifier is a fixed identifier, and has only one state.

For another example, if the first terminal device determines that the OTA upgrade indication information may include only an OTA upgrade authorization identifier in the first state, it may be determined that the second terminal device has permission to perform OTA upgrade on the first terminal device. If the first terminal device determines that the OTA upgrade indication information includes only an OTA upgrade authorization identifier in the second state, it may be determined that the second terminal device does not have permission to perform OTA upgrade on the first terminal device.

For still another example, if the first terminal device determines that the OTA upgrade indication information includes all of the first identification information, the second identification information, and the third identification information at the same time, it may be determined that the second terminal device has permission to perform OTA upgrade on the first terminal device. If the first terminal device determines that the OTA upgrade indication information does not include all of the first identification information, the second identification information, and the third identification information at the same time, it may be determined that the second terminal device does not have permission to perform OTA upgrade on the first terminal device.

For yet another example, if the first terminal device determines that the OTA upgrade indication information is not null, it may be determined that the second terminal device has permission to perform OTA upgrade on the first terminal device. If the first terminal device determines that the OTA upgrade indication information is null, it may be determined that the second terminal device does not have permission to perform OTA upgrade on the first terminal device.

Further, if the first terminal device determines that the second terminal device has permission to perform OTA upgrade on the first terminal device, the first terminal device may perform software upgrade on the N2 functional modules of the first terminal device based on the N2 upgrade subpackages included in the foregoing software upgrade package. Optionally, after determining that upgrade of the N2 functional modules is completed, the first terminal device may send upgrade completion indication information to the second terminal device, to notify the second terminal device that the first terminal device has completed upgrade of the N2 functional modules. Herein, the upgrade completion indication information may include software version information corresponding to the N2 upgraded functional modules and current software version information of N1-N2 functional modules that are modules of the N1 functional modules except the N2 functional modules and that do not need to be upgraded. Optionally, after receiving the upgrade complete indication information, the second terminal device may further forward the upgrade completion indication information to the first network device, to notify the first network device that the first terminal device has completed upgrade of the N2 functional modules. In this way, the first network device may also update, based on the software version information corresponding to the N2 upgraded functional modules, software version information that is of each functional module of the first terminal device and that is stored in the first network device, so that the software version information that is of each functional module of the first terminal device and that is stored in the first network device is latest software version information.

In this embodiment of this disclosure, when determining that the first network device authorizes the second terminal device to perform OTA software upgrade on the first terminal device, the first terminal device performs software upgrade based on the software upgrade package provided by the second terminal device. This can ensure security of software upgrade, and also avoid huge user data traffic overheads and failure of timely software upgrade caused by reasons such as a poor network signal when software upgrade is performed based on an OTA technology, increasing efficiency and security of software upgrade of the first terminal device, and improving user experience of the first terminal device.

Figure 4:
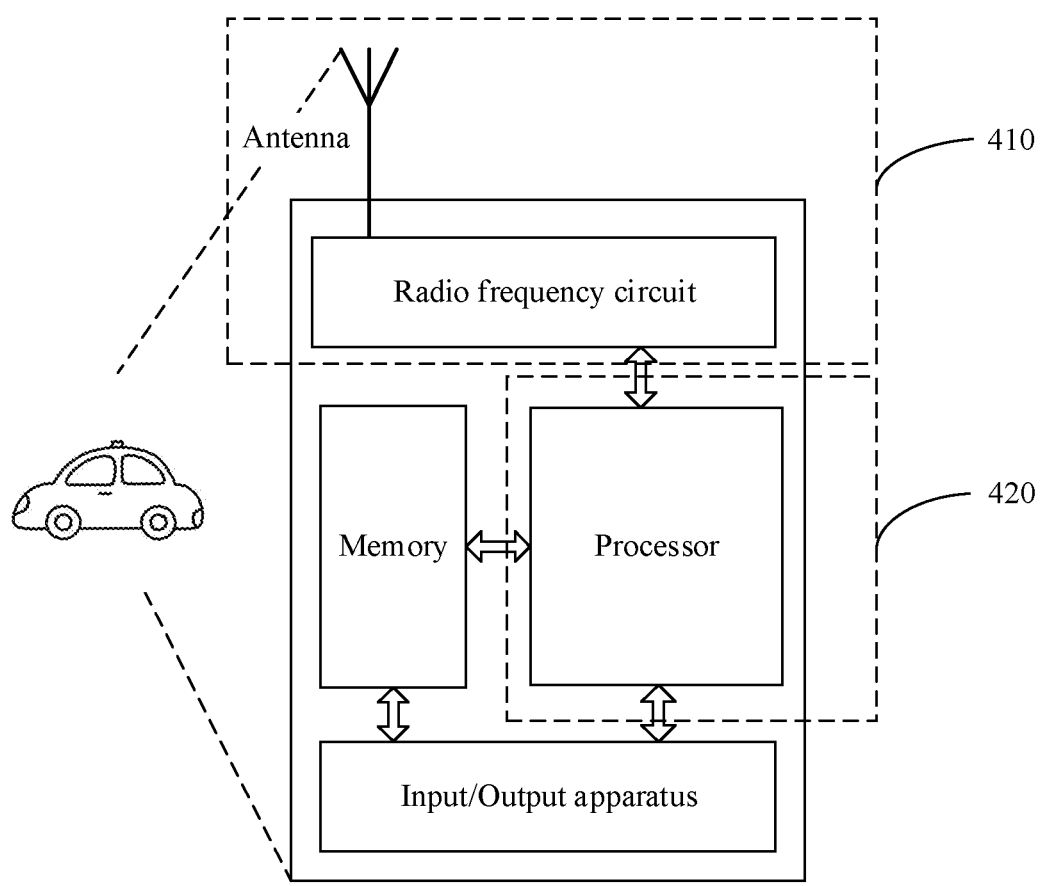
FIG. 4 is a schematic diagram depicting a structure of an apparatus according to an embodiment of this disclosure.

Refer to FIG. 4. FIG. 4 is a schematic diagram depicting a structure of an apparatus according to an embodiment of this disclosure. The apparatus may be the first terminal device described in the foregoing embodiment, and the apparatus may be configured to perform functions of the first terminal device described in the foregoing embodiment. For ease of description, FIG. 4 shows only main components of the apparatus. It can be learned from FIG. 4 that the apparatus includes a processor, a memory, a radio frequency circuit, an antenna, and an input/output apparatus. The processor is mainly configured to process a communication protocol and communication data, control an apparatus, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to receive data input by a user using the apparatus, and output data to the user. It should be noted that, in some scenarios, the communication device may not include the input/output apparatus.

When data needs to be sent, the processor performs baseband processing on to-be-sent data, and outputs a baseband signal to the radio frequency circuit. After performing radio frequency processing on the baseband signal, the radio frequency circuit sends the radio frequency signal in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data and processes the data. For ease of description, FIG. 4 shows only one memory and one processor. In an actual apparatus product, there may be one or more processors and one or more memories. The memory may also be referred to as a storage medium, a storage device, or the like. The memory may be disposed independent of the processor, or may be integrated with the processor. This is not limited in this embodiment of this disclosure.

In an optional implementation, the processor may include a baseband processor and/or a central processing unit (CPU). The baseband processor is mainly configured to process a communication protocol and communication data. The CPU is mainly configured to control the entire terminal device, execute a software program, and process data of the software program. Functions of the baseband processor and the CPU may be integrated into the processor in FIG. 4. A person skilled in the art may understand that the baseband processor and the CPU may alternatively be processors independent of each other, and are interconnected by using a technology such as a bus. A person skilled in the art may understand that the terminal device may include a plurality of baseband processors to adapt to different network standards, the terminal device may include a plurality of CPUs to improve a processing capability of the terminal device, and components of the terminal device may be connected through various buses. The baseband processor may also be expressed as a baseband processing circuit or a baseband processing chip. The CPU may also be expressed as a central processing circuit or a central processing chip. A function of processing the communication protocol and the communication data may be built in the processor, or may be stored in a storage unit in a form of a software program. The processor executes the software program, to implement a baseband processing function.

In this embodiment of this disclosure, the antenna and the radio frequency circuit that have a transceiving function may be considered as a transceiver unit of the apparatus, and the processor having a processing function may be considered as a processing unit of the apparatus. As shown in FIG. 4, the apparatus includes a transceiver unit 410 and a processing unit 420. Herein, the transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 410 and that is configured to implement a receiving function may be considered as a receiving unit, and a component that is in the transceiver unit 410 and that is configured to implement a sending function may be considered as a sending unit. That is, the transceiver unit 410 includes a receiving unit and a sending unit. Herein, the receiving unit may also be sometimes referred to as a receiving machine, a receiver, a receiving circuit, or the like. The sending unit may also be sometimes referred to as a transmitting machine, a transmitter, a transmitting circuit, or the like.

During specific implementation, the transceiver unit 410 is configured to receive OTA software upgrade information from a second terminal device. Herein, the foregoing OTA software upgrade information includes a software upgrade package and OTA upgrade indication information. For a specific process, refer to the process of receiving the OTA software upgrade information by the first terminal device described in step S201 in Embodiment 1. Details are not described herein again. The processing unit 420 is configured to determine that the software upgrade package and the OTA upgrade indication information are generated by a first network device and provided to the second terminal device. For a specific process, refer to the process described in step S202 in Embodiment 1. Details are not described herein again. The processing unit 420 is further configured to perform software upgrade based on the software upgrade package after it is determined, based on the OTA upgrade indication information, that the second terminal device has permission to perform OTA upgrade on the first terminal device. For a specific process, refer to the process described in step S203 in Embodiment 1. Details are not described herein again.

In an optional implementation, the processing unit 420 is configured to verify a first digital signature of the software upgrade package by using a first public key of the first network device, and/or verify a second digital signature of the OTA upgrade indication information by using a second public key of the first network device. It is determined that the software upgrade package and/or the OTA upgrade indication information are/is generated by the first network device and provided to the second terminal device if it is determined that the first digital signature of the software upgrade package and/or the second digital signature of the OTA upgrade indication information are/is verified.

In an optional implementation, the processing unit 420 is configured to determine that the second terminal device has permission to perform OTA upgrade on the first terminal device if it is determined that the OTA upgrade indication information includes at least one of the following: first identification information of the first network device, second identification information of the second terminal device, third identification information of the first terminal device, and an OTA upgrade authorization identifier.

In an optional implementation, the processing unit 420 is configured to trigger the transceiver unit 410 to send the OTA upgrade indication information to the first network device. It is determined that the second terminal device has permission to perform OTA upgrade on the first terminal device if it is determined that the transceiver unit 410 receives a permission verification success identifier sent by the first network device for the OTA upgrade indication information. The OTA upgrade indication information herein indicating that the second terminal device has permission to perform OTA upgrade on the first terminal device includes at least one of the following: the first identification information of the first network device, the second identification information of the second terminal device, the third identification information of the first terminal device, and the OTA upgrade authorization identifier.

In an optional implementation, the processing unit 420 is configured to determine that integrity verification on the software upgrade package and the OTA upgrade indication information succeeds.

In an optional implementation, the software upgrade package includes upgrade subpackages corresponding to N2 functional modules in N1 functional modules of the first terminal device.

In an optional implementation, the transceiver unit 410 is configured to send upgrade completion indication information to the second terminal device. The upgrade completion indication information indicates that software upgrade of the N2 functional modules is completed.

Figure 5:
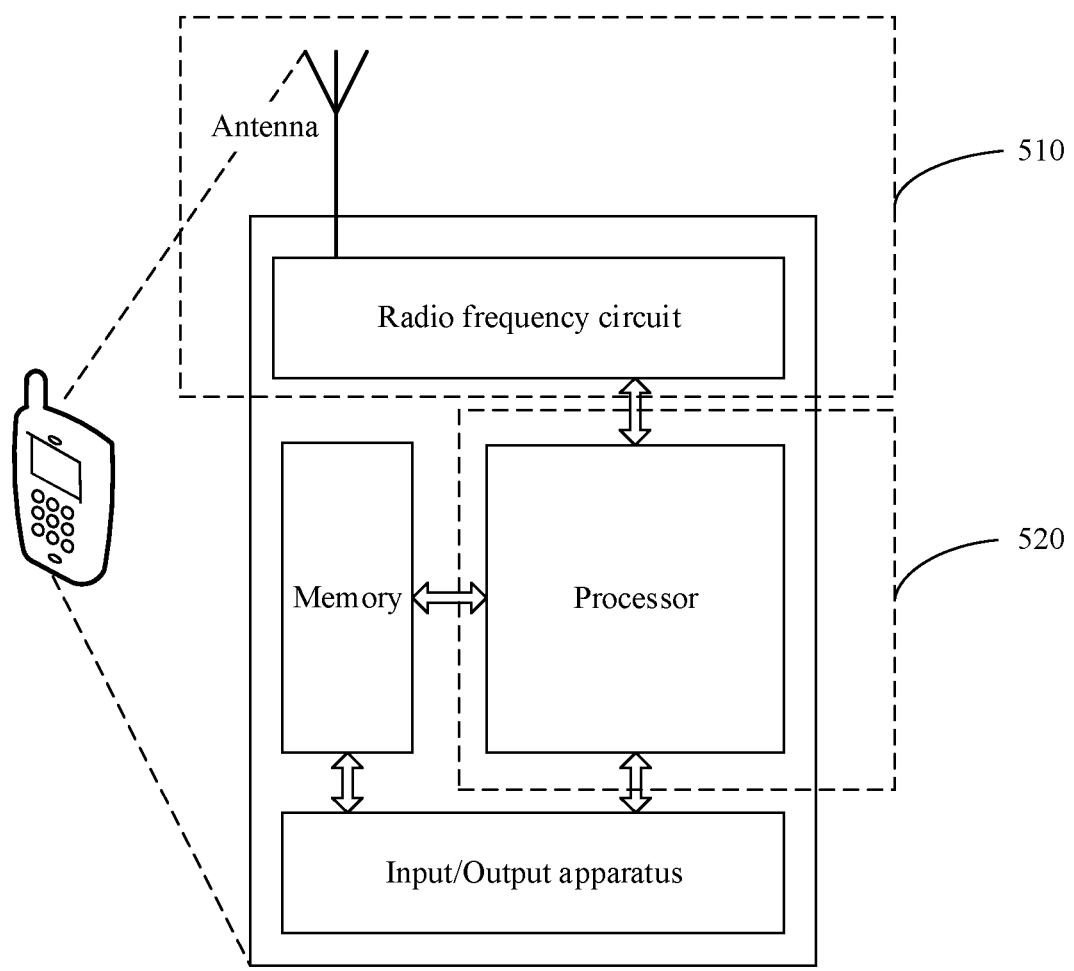
FIG. 5 is a schematic diagram depicting another structure of an apparatus according to an embodiment of this disclosure.

Refer to FIG. 5. FIG. 5 is a schematic diagram depicting another structure of an apparatus according to an embodiment of this disclosure. The apparatus may be the second terminal device described in the foregoing Embodiment 1, and the apparatus may be configured to perform functions of the second terminal device described in the foregoing embodiment. For ease of description, FIG. 5 shows only main components of the apparatus. It can be learned from FIG. 5 that the apparatus includes a processor, a memory, a radio frequency circuit, an antenna, and an input/output apparatus. The apparatus shown in FIG. 5 is similar to the apparatus shown in FIG. 4 in structure. For specific content, refer to the foregoing description of the apparatus in FIG. 4. Details are not described herein again.

In this embodiment of this disclosure, the antenna and the radio frequency circuit that have a transceiving function may be considered as a transceiver unit of the apparatus, and the processor having a processing function may be considered as a processing unit of the apparatus. As shown in FIG. 5, the apparatus includes a transceiver unit 510 and a processing unit 520. Herein, the transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 510 and that is configured to implement a receiving function may be considered as a receiving unit, and a component that is in the transceiver unit 510 and that is configured to implement a sending function may be considered as a sending unit. That is, the transceiver unit 510 includes a receiving unit and a sending unit. Herein, the receiving unit may also be sometimes referred to as a receiving machine, a receiver, a receiving circuit, or the like. The sending unit may also be sometimes referred to as a transmitting machine, a transmitter, a transmitting circuit, or the like.

During specific implementation, the transceiver unit 510 is configured to receive a software upgrade package sent by a first network device. Herein, the software upgrade package corresponds to a first digital signature determined by the first network device. For a specific process, refer to the process of receiving the software upgrade package sent by the first network device described in step S2003 in Embodiment 1. Details are not described herein again. The transceiver unit 510 is further configured to receive OTA upgrade indication information sent by the first network device. The OTA upgrade indication information indicates whether the second terminal device has OTA upgrade permission for a first terminal device, and the OTA upgrade indication information corresponds to a second digital signature determined by the first network device. For a specific process, refer to the process described in step S2006 in Embodiment 1. Details are not described herein again. The processing unit 520 is configured to generate OTA software upgrade information that includes the software upgrade package and the OTA upgrade indication information. The transceiver unit 510 is further configured to send the OTA software upgrade information to the first terminal device.

In an optional implementation, before the transceiver unit 510 receives the OTA upgrade indication information sent by the first network device, the transceiver unit 510 is further configured to send an OTA upgrade permission verification request to the first network device. The OTA upgrade permission verification request is used to request the first network device to determine whether the second terminal device has permission to perform OTA upgrade on the first terminal device. The OTA upgrade permission verification request includes third identification information of the first terminal device.

In an optional implementation, the OTA upgrade indication information indicating that the second terminal device has permission to perform OTA upgrade on the first terminal device includes at least one of the following: first identification information of the first network device, second identification information of the second terminal device, the third identification information of the first terminal device, and an OTA upgrade authorization identifier.

In an optional implementation, the software upgrade package includes upgrade subpackages corresponding to N2 functional modules in N1 functional modules of the first terminal device.

In an optional implementation, the transceiver unit 510 is configured to receive upgrade completion indication information sent by the first terminal device. The upgrade completion indication information indicates that software upgrade of the N2 functional modules is completed.

Figure 6:
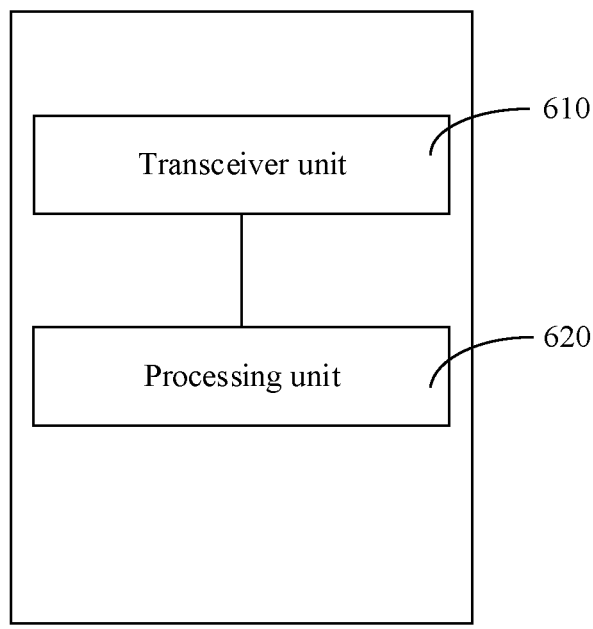
FIG. 6 is a schematic diagram depicting still another structure of an apparatus according to an embodiment of this disclosure.

Refer to FIG. 6. FIG. 6 is a schematic diagram depicting still another structure of an apparatus according to an embodiment of this disclosure. As shown in FIG. 6, the apparatus may be used in the communication system shown in FIG. 1, to perform functions of the network device in Embodiment 1. The apparatus may include one or more transceiver units 610 and one or more processing units 620. The transceiver unit 610 may be referred to as a transceiver machine, a transceiver circuit, a transceiver, or the like, and may include at least one antenna and one radio frequency unit. The transceiver unit 610 is mainly configured to receive and send a radio frequency signal and perform conversion between a radio frequency signal and a baseband signal, for example configured to send the indication information in the foregoing embodiments to a terminal device. The processing unit 620 is mainly configured to perform baseband processing, control the apparatus, and the like. The transceiver unit 610 and the processing unit 620 may be physically disposed together, or may be physically disposed separately. To be specific, the apparatus is a distributed apparatus. For example, the processing unit 620 may be configured to control the apparatus to perform the process of determining the indication information in the foregoing embodiments. During specific implementation, the processing unit 620 may include one or more boards. A plurality of boards may jointly support a radio access network (for example, an NR network) of a single access standard, or may support radio access networks of different access standards. The processing unit 620 further includes a memory and a processor. The memory is configured to store necessary instructions and data. The processor is configured to control the apparatus to perform a necessary action, for example configured to control the apparatus to perform an operation procedure that is related to the apparatus and that is in the foregoing method embodiments. The memory and the processor may serve one or more boards. In other words, a memory and a processor may be disposed on each board. Alternatively, a plurality of boards may share a same memory and a same processor. In addition, a necessary circuit may be further disposed on each board.

In an optional implementation, the processor may include a baseband processor and/or a CPU. The baseband processor is mainly configured to process a communication protocol and communication data. The CPU is mainly configured to control the entire apparatus, execute a software program, and process data of the software program. Functions of the baseband processor and the CPU may be integrated into the processor in FIG. 6. A person skilled in the art may understand that the baseband processor and the CPU may alternatively be processors independent of each other, and are interconnected by using a technology such as a bus. A person skilled in the art may understand that the apparatus may include a plurality of baseband processors to adapt to different network standards, the apparatus may include a plurality of CPUs to improve a processing capability of the apparatus, and components of the apparatus may be connected through various buses. The baseband processor may also be expressed as a baseband processing circuit or a baseband processing chip. The CPU may also be expressed as a central processing circuit or a central processing chip. A function of processing the communication protocol and the communication data may be built in the processor, or may be stored in a storage unit in a form of a software program. The processor executes the software program, to implement a baseband processing function.

During specific implementation, the processing unit 620 is configured to determine a software upgrade package corresponding to the first terminal device and OTA upgrade indication information. The OTA upgrade indication information herein indicates whether the second terminal device has permission to perform OTA upgrade on the first terminal device. For a specific process, refer to the process of determining the software upgrade package corresponding to the first terminal device and the OTA upgrade indication information that are described in steps S2002 and S2005 in Embodiment 1. Details are not described herein again. The transceiver unit 610 is configured to send the software upgrade package and the OTA upgrade indication information to the second terminal device. For a specific process, refer to the process of sending the software upgrade package and the OTA upgrade indication information to the second terminal device in steps S2003 and S2006 in Embodiment 1. Details are not described herein again.

In an optional implementation, the transceiver unit 610 is configured to receive an upgrade package download request sent by the second terminal device. The upgrade package download request is used to request the first network device to provide the software upgrade package corresponding to the first terminal device to the second terminal device.

In an optional implementation, the transceiver unit 610 is configured to receive OTA software update information sent by a second network device. The OTA software update information includes at least first software version information corresponding to N1 functional modules of the first terminal device and upgrade subpackages corresponding to the N1 functional modules. The processing unit 620 is configured to determine the software upgrade package of the first terminal device based on upgrade subpackages corresponding to N2 functional modules if it is determined that second software version information of the N2 functional modules in the N1 functional modules of the first terminal device is earlier than first software version information of the N2 functional modules included in the OTA software update information. N2 is less than or equal to N1, and the software upgrade package corresponds to a first digital signature determined by the first network device.

In an optional implementation, the transceiver unit 610 is configured to receive an OTA upgrade permission verification request sent by the second terminal device. The OTA upgrade permission verification request includes at least third identification information of the first terminal device. The processing unit 620 is configured to generate, based on whether there is a binding relationship between the second terminal device and the first terminal device, the OTA upgrade indication information indicating whether the second terminal device has permission to perform OTA upgrade on the first terminal device. The OTA upgrade indication information corresponds to a second digital signature determined by the first network device.

In an optional implementation, the OTA upgrade indication information indicating that the second terminal device has permission to perform OTA upgrade on the first terminal device includes at least one of the following: first identification information of the first network device, second identification information of the second terminal device, the third identification information of the first terminal device, and an OTA upgrade authorization identifier.

In an optional implementation, the transceiver unit 610 is further configured to receive the OTA upgrade indication information sent by the first terminal device. The processing unit is further configured to trigger the transceiver unit to send a permission verification success identifier to the first terminal device if it is determined that the OTA upgrade indication information includes at least one of the following: the first identification information of the first network device, the second identification information of the second terminal device, the third identification information of the first terminal device, and the OTA upgrade authorization identifier.

Figure 7:
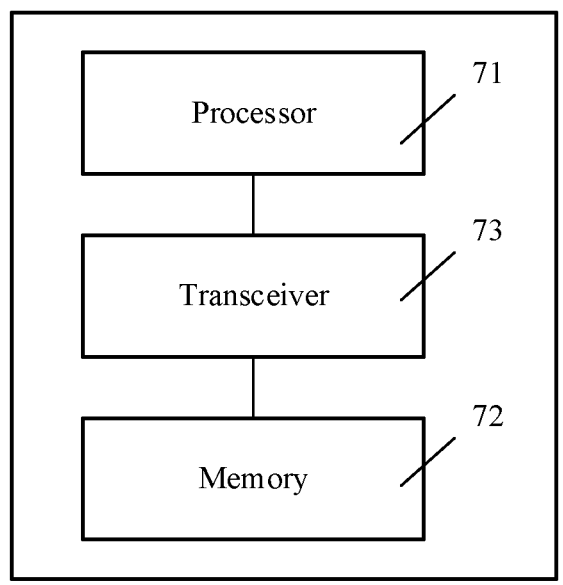
FIG. 7 is a schematic diagram depicting yet another structure of an apparatus according to an embodiment of this disclosure.

Refer to FIG. 7. FIG. 7 is a schematic diagram depicting yet another structure of an apparatus according to an embodiment of this disclosure. The apparatus may be the first terminal device in Embodiment 1, and the apparatus may be configured to implement the software upgrade method implemented by the first terminal device. The apparatus includes a processor 71, a memory 72, and a transceiver 73.

The memory 72 includes but is not limited to a random-access memory (RAM), a read-only memory (ROM), an erasable programmable ROM (EPROM), or a compact disc (CD) ROM (CD-ROM), and the memory 72 is configured to store related instructions and data. The memory 72 stores the following elements: an executable module or a data structure, a subset thereof, or an extended set thereof, operation instructions: including various operation instructions, used for implementing various operations, and an operating system: including various system programs, used for implementing various basic services and processing a hardware-based task.

Only one memory is shown in FIG. 7. Certainly, a plurality of memories may be disposed as needed.

The transceiver 73 may be a communication module or a transceiver circuit. In this embodiment of this disclosure, the transceiver 73 is configured to perform operations such as receiving a software upgrade package and OTA upgrade indication information in the foregoing embodiments.

The processor 71 may be a controller, a CPU, a general-purpose processor, a digital signal processor (DSP), an application-specific integrated circuit (ASIC), a field-programmable gate array (FPGA) or another programmable logic device, a transistor logic device, a hardware component, or any combination thereof. The processor may implement or execute various example logical blocks, modules, and circuits described with reference to content disclosed in embodiments of this disclosure. Alternatively, the processor 71 may be a combination implementing a computing function, for example, a combination of one or more microprocessors, or a combination of a DSP and a microprocessor.

In specific application, components of the apparatus may be coupled together by using a bus system. In addition to a data bus, the bus system may further include a power supply bus, a control bus, a status signal bus, and the like.

An embodiment of this disclosure further provides a computer-readable medium. The computer-readable medium stores a computer program, and when the computer program is executed by a computer, the methods or steps performed by the first terminal device in the foregoing embodiments are implemented.

An embodiment of this disclosure further provides a computer program product. When the computer program product is executed by a computer, the methods or steps performed by the first terminal device in the foregoing embodiments are implemented.

An embodiment of this disclosure further provides an apparatus. The apparatus may be the first terminal device in the foregoing embodiments. The apparatus includes a processor and an interface. The processor is configured to perform the methods or steps performed by a terminal device in the foregoing embodiments. It should be understood that the terminal device may be a chip, and the processor may be implemented by hardware or software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and exist independently.

Figure 8:
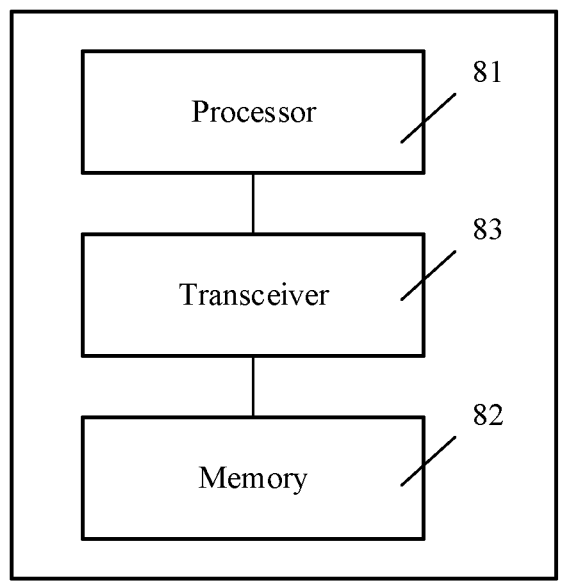
FIG. 8 is a schematic diagram depicting still yet another structure of an apparatus according to an embodiment of this disclosure.

Refer to FIG. 8. FIG. 8 is a schematic diagram depicting still yet another structure of an apparatus according to an embodiment of this disclosure. The apparatus may be the second terminal device in the foregoing embodiments, and the apparatus may be configured to implement the method implemented by the second terminal device in the foregoing embodiments. The apparatus includes a processor 81, a memory 82, and a transceiver 83.

The memory 82 includes but is not limited to a RAM, a ROM, an EPROM, or a CD-ROM, and the memory 82 is configured to store related instructions and data. The memory 82 stores the following elements: an executable module or a data structure, a subset thereof, or an extended set thereof, operation instructions: including various operation instructions, used for implementing various operations, and an operating system: including various system programs, used for implementing various basic services and processing a hardware-based task.

Only one memory is shown in FIG. 8. Certainly, a plurality of memories may be disposed as needed.

The transceiver 83 may be a communication module or a transceiver circuit. In this embodiment of this disclosure, the transceiver 83 is configured to perform operations such as receiving a software upgrade package and OTA upgrade indication information from a first network device.

The processor 81 may be a controller, a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in embodiments of this disclosure. Alternatively, the processor 81 may be a combination implementing a computing function, for example, a combination of one or more microprocessors, or a combination of a DSP and a microprocessor.

In specific application, components of the apparatus may be coupled together by using a bus system. In addition to a data bus, the bus system may further include a power supply bus, a control bus, a status signal bus, and the like.

An embodiment of this disclosure further provides a computer-readable medium. The computer-readable medium stores a computer program, and when the computer program is executed by a computer, the methods or steps performed by the second terminal device in the foregoing embodiments are implemented.

An embodiment of this disclosure further provides a computer program product. When the computer program product is executed by a computer, the methods or steps performed by the second terminal device in the foregoing embodiments are implemented.

An embodiment of this disclosure further provides an apparatus. The apparatus may be the second terminal device in the foregoing embodiments. The apparatus includes a processor and an interface. The processor is configured to perform the methods or steps performed by a terminal device in the foregoing embodiments. It should be understood that the terminal device may be a chip, and the processor may be implemented by hardware or software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and exist independently.

Figure 9:
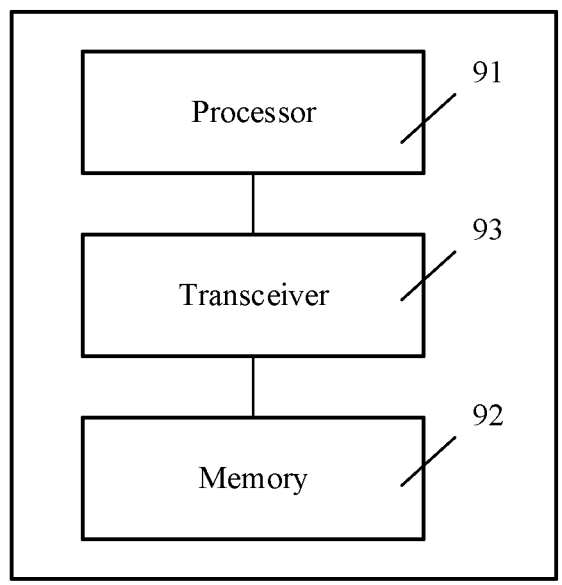
FIG. 9 is a schematic diagram depicting a further structure of an apparatus according to an embodiment of this disclosure.

Refer to FIG. 9. FIG. 9 is a schematic diagram depicting a further structure of an apparatus according to an embodiment of this disclosure. The apparatus may be a network device in Embodiment 1, and may be configured to implement the methods or steps implemented by the network device in Embodiment 1. The apparatus includes a processor 91, a memory 92, and a transceiver 93.

The memory 92 includes but is not limited to a RAM, a ROM, an EPROM, or a CD-ROM, and the memory 92 is configured to store related instructions and data. The memory 92 stores the following elements: an executable module or a data structure, a subset thereof, or an extended set thereof, operation instructions: including various operation instructions, used for implementing various operations, and an operating system: including various system programs, used for implementing various basic services and processing a hardware-based task.

Only one memory is shown in FIG. 9. Certainly, a plurality of memories may be disposed as needed.

The transceiver 93 may be a communication module or a transceiver circuit. In this embodiment of this disclosure, the transceiver 93 is configured to perform operations such as receiving a software upgrade package and OTA upgrade indication information in the foregoing embodiments.

The processor 91 may be a controller, a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in embodiments of this disclosure. Alternatively, the processor 91 may be a combination implementing a computing function, for example, a combination of one or more microprocessors, or a combination of a DSP and a microprocessor.

In specific application, components of the apparatus may be coupled together by using a bus system. In addition to a data bus, the bus system may further include a power supply bus, a control bus, a status signal bus, and the like.

It should be noted that, during actual application, the processor in this embodiment of this disclosure may be an integrated circuit chip, and has a signal processing capability. In an implementation process, the steps in the foregoing method embodiments can be implemented by using a hardware integrated logic circuit in the processor, or by using instructions in a form of software. The processor may be a general-purpose processor, a DSP, an ASIC, an FPGA or another programmable logic device, a discrete gate or transistor logic device, or a discrete hardware component. The processor may implement or perform the methods, steps, and logical block diagrams that are disclosed in embodiments of this disclosure.

It should be noted that this disclosure further provides a communication system, including the foregoing one or more first terminal devices, one or more second terminal devices, and one or more network devices.

All or a part of the foregoing method embodiments may be implemented by software, hardware, firmware, or any combination thereof. When the software is used to implement the embodiments, all or a part of the embodiments may be implemented in a form of a computer program product. The computer program product includes one or more computer instructions. When the computer instructions are loaded and executed on a computer, the procedures or functions according to embodiments of this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density DIGITAL VERSATILE DISC (DVD)), a semiconductor medium (for example, a solid-state drive (SSD)), or the like.

It should be noted that, during actual application, the processor in this embodiment of this disclosure may be an integrated circuit chip, and has a signal processing capability. In an implementation process, the steps in the foregoing method embodiments can be implemented by using a hardware integrated logic circuit in the processor, or by using instructions in a form of software. The processor may be a general-purpose processor, a DSP, an ASIC, an FPGA or another programmable logic device, a discrete gate or transistor logic device, or a discrete hardware component. The processor may implement or perform the methods, steps, and logical block diagrams that are disclosed in embodiments of this disclosure. The general-purpose processor may be a microprocessor, or the processor may be any conventional processor or the like. The steps in the methods disclosed with reference to embodiments of this disclosure may be directly performed and completed by a hardware decoding processor, or may be performed and completed by using a combination of hardware in the decoding processor and a software module. The software module may be located in a mature storage medium in the art, for example, a RAM, a flash memory, a ROM, a programmable ROM (PROM), an electrically EPROM (EEPROM), or a register. The storage medium is located in the memory, and the processor reads information in the memory and completes the steps in the foregoing methods in combination with hardware of the processor.

It may be understood that the memory in this embodiment of this disclosure may be a volatile memory or a nonvolatile memory, or may include a volatile memory and a nonvolatile memory. The nonvolatile memory may be a ROM, a PROM, an EPROM, an EEPROM, or a flash memory. The volatile memory may be a RAM and is used as an external cache. For example but not limitation, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM. It should be noted that the memory described in embodiments of this disclosure aims to include but is not limited to these memories and any memory of another proper type.

It should be understood that the terms "system" and "network" may be used interchangeably in embodiments of this disclosure. The term "and/or" in embodiments describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

In embodiments provided in this disclosure, it should be understood that the disclosed system, apparatus, and method may be implemented in other manners. For example, the described apparatuses are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

In conclusion, the foregoing descriptions are merely example embodiments of the technical solutions of this disclosure, but are not intended to limit the protection scope of this disclosure. Any modification, equivalent replacement, or improvement made without departing from the spirit and principle of this disclosure shall fall within the protection scope of this disclosure.

What is claimed is:

1. A software upgrade method implemented by a first terminal device, wherein the software upgrade method comprises:
   receiving, from a second terminal device, over-the-air (OTA) software upgrade information comprising a software upgrade package and OTA upgrade indication information;
   determining that the software upgrade package and the OTA upgrade indication information were generated by a network device and provided to the second terminal device;
   identifying that the OTA upgrade indication information comprises first identification information of the network device, second identification information of the second terminal device, and third identification information of the first terminal device;
   determining, in response to the identifying and based on the OTA upgrade indication information, that the second terminal device has permission to perform an OTA upgrade on the first terminal device, wherein the OTA upgrade indication information is based on whether there is a binding relationship between the first terminal device and the second terminal device; and
   performing, based on the software upgrade package, a software upgrade after determining that the second terminal device has the permission to perform the OTA upgrade.

2. The software upgrade method of claim 1, further comprising:
   verifying, using a first public key of the network device, a first digital signature of the software upgrade package;
   verifying, using a second public key of the network device, a second digital signature of the OTA upgrade indication information; and
   further determining that the software upgrade package and the OTA upgrade indication information were generated by the network device and provided to the second terminal device when the first digital signature and the second digital signature are verified.

3. The software upgrade method of claim 1, further comprising:
   sending the OTA upgrade indication information to the network device;
   receiving, from the network device and in response to the OTA upgrade indication information, a permission verification success identifier; and
   further determining, based on the permission verification success identifier, that the second terminal device has permission to perform the OTA upgrade on the first terminal device.

4. The software upgrade method of claim 1, wherein before determining that the second terminal device has permission to perform the OTA upgrade on the first terminal device, the software upgrade method further comprises determining that integrity verification on the software upgrade package and the OTA upgrade indication information has succeeded.

5. The software upgrade method of claim 1, further comprising:
   verifying, using a public key of the network device, a digital signature of the software upgrade package; and
   further determining that the software upgrade package is generated by the network device and provided to the second terminal device when the digital signature is verified.

6. The software upgrade method of claim 1, further comprising:
   verifying, using a public key of the network device, a digital signature of the OTA upgrade indication information; and
   further determining that the OTA upgrade indication information was generated by the network device and provided to the second terminal device when the digital signature is verified.

7. A software upgrade method implemented by a second terminal device, wherein the software upgrade method comprises:
   receiving, from a network device, a software upgrade package corresponding to a first digital signature;
   receiving, from the network device, over-the-air (OTA) upgrade indication information indicating whether the second terminal device has OTA upgrade permission for a first terminal device, wherein the OTA upgrade indication information is based on whether there is a binding relationship between the first terminal device and the second terminal device, wherein the OTA upgrade indication information comprises first identification information of the network device, second identification information of the second terminal device, and third identification information of the first terminal device, and wherein the OTA upgrade indication information corresponds to a second digital signature; and
   sending, to the first terminal device, OTA software upgrade information comprising the OTA upgrade indication information and the software upgrade package.

8. The software upgrade method of claim 7, wherein before receiving the OTA upgrade indication information, the software upgrade method further comprises sending, to the network device, an OTA upgrade permission verification request requesting the network device to determine whether the second terminal device has permission to perform an OTA upgrade on the first terminal device, and wherein the OTA upgrade permission verification request comprises identification information of the first terminal device.

9. The software upgrade method of claim 7, wherein the OTA upgrade indication information further comprises an OTA upgrade authorization identifier.

10. A software upgrade method implemented by a first network device, wherein the software upgrade method comprises:
    receiving, from a second network device, over-the-air (OTA) software update information comprising first software version information corresponding to N1 functional modules of a first terminal device and first upgrade subpackages corresponding to the N1 functional modules, wherein the first upgrade subpackages are configured to upgrade software on the first terminal device;

determining a first digital signature corresponding to a software upgrade package, wherein the software upgrade package corresponds to the first terminal device;

determining, based on second upgrade subpackages corresponding to N2 functional modules that are in the N1 functional modules and that are comprised in the OTA software update information when second software version information of the N2 functional modules is earlier than second software version information of the N2 functional modules, the software upgrade package, wherein N2 is less than or equal to N1;

determining, based on whether there is a binding relationship between the first terminal device and a second terminal device, OTA upgrade indication information indicating the second terminal device has permission to perform an OTA upgrade on the first terminal device; and sending, to the second terminal device, the software upgrade package and the OTA upgrade indication information.

11. The software upgrade method of claim 10, wherein before determining the software upgrade package, the software upgrade method further comprises receiving, from the second terminal device, an upgrade package download request requesting the first network device to provide the software upgrade package to the second terminal device.

12. The software upgrade method of claim 10, further comprising:
receiving, from the second terminal device, an OTA upgrade permission verification request comprising third identification information of the first terminal device;

determining a second digital signature that the OTA upgrade indication information corresponds to; and generating, based on the binding relationship between the second terminal device and the first terminal device, the OTA upgrade indication information.

13. The software upgrade method of claim 12, wherein the OTA upgrade indication information comprises first identification information of the first network device, second identification information of the second terminal device, and the third identification information.

14. The software upgrade method of claim 10, further comprising:
receiving, from the first terminal device, the OTA upgrade indication information;
identifying that the OTA upgrade indication information comprises at least one of first identification information of the first network device, second identification information of the second terminal device, third identification information of the first terminal device, or an OTA upgrade authorization identifier; and
sending, to the first terminal device in response to the identifying, a permission verification success identifier.

15. A first terminal device comprising:
a memory configured to store instructions; and
a processor coupled to the memory and configured to execute the instructions to cause the first terminal device to:
receive, from a second terminal device, over-the-air (OTA) software upgrade information comprising a software upgrade package and OTA upgrade indication information;

determine that the software upgrade package and the OTA upgrade indication information were generated by a network device and provided to the second terminal device;

identify that the OTA upgrade indication information comprises first identification information of the network device, second identification information of the second terminal device, and third identification information of the first terminal device;

determine, in response to the identifying and based on the OTA upgrade indication information, that the second terminal device has permission to perform an OTA upgrade on the first terminal device, wherein the OTA upgrade indication information is based on whether there is a binding relationship between the first terminal device and the second terminal device; and perform, based on the software upgrade package and after determining that the second terminal device has the permission to perform the OTA upgrade on the first terminal device, a software upgrade.

16. A second terminal device comprising:
a memory configured to store instructions; and
a processor coupled to the memory and configured to execute the instructions to cause the second terminal device to:
receive, from a network device, a software upgrade package corresponding to a first digital signature;

receive, from the network device, over-the-air (OTA) upgrade indication information indicating whether the second terminal device has OTA upgrade permission for a first terminal device, wherein the OTA upgrade indication information is based on whether there is a binding relationship between the first terminal device and the second terminal device, wherein the OTA upgrade indication information comprises first identification information of the network device, second identification information of the second terminal device, and third identification information of the first terminal device, and wherein the OTA upgrade indication information corresponds to a second digital signature; and send, to the first terminal device, OTA software upgrade information comprising the OTA upgrade indication information and the software upgrade package.

17. A network device comprising:
a memory configured to store instructions; and
a processor coupled to the memory and configured to execute the instructions to cause the network device to:
receive, from a second network device, over-the-air (OTA) software update information comprising first software version information corresponding to N1 functional modules of a first terminal device and first upgrade subpackages corresponding to the N1 functional modules, wherein the first upgrade subpackages are configured to upgrade software on the first terminal device;

determine a first digital signature corresponding to a software upgrade package, wherein the software upgrade package corresponds to the first terminal device;

determine, based on second upgrade subpackages corresponding to N2 functional modules that are in the N1 functional modules and that are comprised in the OTA software update information when second software version information of the N2 functional modules is earlier than second software version information of the N2 functional modules, the software upgrade package, wherein N2 is less than or equal to N1;

determine, based on whether there is a binding relationship between the first terminal device and a second terminal device, OTA upgrade indication information indicating the second terminal device has permission to perform an OTA upgrade on the first terminal device; and send, to the second terminal device, the software upgrade package and the OTA upgrade indication information.

18. The network device of claim 17, wherein the processor is further configured to execute the instructions to cause the network device to receive, from the second terminal device, an upgrade package download request requesting the network device to provide the software upgrade package to the second terminal device.

19. The network device of claim 17, wherein the processor is further configured to execute the instructions to cause the network device to:

receive, from the second terminal device, an OTA upgrade permission verification request comprising third identification information of the first terminal device;

determine a second digital signature that the OTA upgrade indication information corresponds to; and generate, based on the binding relationship between the second terminal device and the first terminal device, the OTA upgrade indication information.

20. The network device of claim 19, wherein the OTA upgrade indication information comprises first identification information of the network device, second identification information of the second terminal device, and the third identification information.

* * * * *